(12) United States Patent
Bruzzo et al.

(10) Patent No.: US 11,484,802 B2
(45) Date of Patent: *Nov. 1, 2022

(54) INTERACTIVE GAMEPLAY PLAYBACK SYSTEM

(71) Applicant: Electronic Arts Inc., Redwood City, CA (US)

(72) Inventors: Christopher Loren Bruzzo, San Carlos, CA (US); Arthur Francois Marie Rohart, London (GB); Oghene Fejiro Bateren, Liverpool (GB)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/953,206

(22) Filed: Nov. 19, 2020

(65) Prior Publication Data

US 2021/0146262 A1    May 20, 2021

Related U.S. Application Data

(63) Continuation of application No. 16/298,875, filed on Mar. 11, 2019, now Pat. No. 10,850,204, which is a continuation of application No. 15/199,827, filed on Jun. 30, 2016, now Pat. No. 10,226,708.

(51) Int. Cl.
| | | |
|---|---|---|
| *A63F 13/86* | (2014.01) |
| *A63F 13/35* | (2014.01) |
| *A63F 13/48* | (2014.01) |
| *A63F 13/20* | (2014.01) |
| *A63F 13/25* | (2014.01) |
| *A63F 13/30* | (2014.01) |
| *A63F 13/32* | (2014.01) |
| *A63F 13/33* | (2014.01) |
| *A63F 13/332* | (2014.01) |
| *A63F 13/335* | (2014.01) |

(52) U.S. Cl.
CPC .............. *A63F 13/86* (2014.09); *A63F 13/20* (2014.09); *A63F 13/25* (2014.09); *A63F 13/30* (2014.09); *A63F 13/32* (2014.09); *A63F 13/33* (2014.09); *A63F 13/332* (2014.09); *A63F 13/335* (2014.09); *A63F 13/35* (2014.09); *A63F 13/48* (2014.09)

(58) Field of Classification Search
CPC .......... A63F 13/23; A63F 13/45; A63F 13/49; A63F 13/493; A63F 13/497; A63F 2300/5533
See application file for complete search history.

(56) References Cited

U.S. PATENT DOCUMENTS

| | | |
|---|---|---|
| 5,395,242 A | 3/1995 | Slye et al. |
| 6,699,127 B1 | 3/2004 | Lobb et al. |
| 7,214,133 B2 | 5/2007 | Jen et al. |
| 7,632,186 B2 | 12/2009 | Spanton et al. |

(Continued)

FOREIGN PATENT DOCUMENTS

CN    103886008 A    6/2014

*Primary Examiner* — Omkar A Deodhar
(74) *Attorney, Agent, or Firm* — Knobbe, Martens, Olson & Bear, LLP

(57) ABSTRACT

The disclosure provides a video playback system for use within a game application and/or other interactive computing environments. The video playback system can be used to capture gameplay during execution of a game application. The captured gameplay video can be processed and stored within the game application or in a network accessible location.

20 Claims, 16 Drawing Sheets

(56) References Cited

U.S. PATENT DOCUMENTS

| | | |
|---|---|---|
| 8,405,662 B2 | 3/2013 | Russell et al. |
| 8,423,164 B2 | 4/2013 | Jaeger |
| 8,591,332 B1 | 11/2013 | Bright et al. |
| 8,622,839 B1 | 1/2014 | McKenzie et al. |
| 8,870,661 B2 | 10/2014 | Perry et al. |
| 9,005,033 B2 | 4/2015 | Figueroa |
| 9,064,043 B2 | 6/2015 | Cathro |
| 9,171,286 B2 | 10/2015 | Bhogal et al. |
| 9,248,374 B2 | 2/2016 | Watson et al. |
| 9,272,209 B2 | 3/2016 | Perlman et al. |
| 9,393,486 B2 | 7/2016 | George |
| 9,409,083 B2 | 8/2016 | George |
| 9,474,973 B2 | 10/2016 | Perry et al. |
| 10,016,689 B2 | 7/2018 | Lucas et al. |
| 10,226,708 B2 | 3/2019 | Bruzzo et al. |
| 10,850,204 B2 | 12/2020 | Bruzzo et al. |
| 2003/0216177 A1 | 11/2003 | Aonuma et al. |
| 2006/0030407 A1 | 2/2006 | Thayer |
| 2006/0148571 A1 | 7/2006 | Hossack et al. |
| 2007/0060359 A1 | 3/2007 | Smith |
| 2007/0294089 A1 | 12/2007 | Garbow et al. |
| 2009/0048023 A1 | 2/2009 | Wang |
| 2009/0118018 A1 | 5/2009 | Perlman et al. |
| 2009/0258708 A1 | 10/2009 | Figueroa |
| 2010/0069159 A1 | 3/2010 | Yamada et al. |
| 2012/0083336 A1 | 4/2012 | Ocko et al. |
| 2012/0144311 A1 | 6/2012 | Yeh et al. |
| 2012/0204153 A1 | 8/2012 | Peterson et al. |
| 2013/0084985 A1 | 4/2013 | Green et al. |
| 2013/0172086 A1 | 7/2013 | Ikenaga |
| 2013/0244790 A1 | 9/2013 | Gary |
| 2013/0263090 A1 | 10/2013 | Polk et al. |
| 2014/0094313 A1 | 4/2014 | Watson et al. |
| 2014/0228112 A1 | 8/2014 | Laakkonen et al. |
| 2014/0274297 A1 | 9/2014 | Lewis et al. |
| 2014/0337346 A1 | 11/2014 | Barthel et al. |
| 2015/0262200 A1 | 9/2015 | Fredette |
| 2015/0287053 A1 | 10/2015 | Fredette |
| 2016/0027143 A1 | 1/2016 | Amidei et al. |
| 2016/0059127 A1 | 3/2016 | Perrin |
| 2016/0184712 A1 | 6/2016 | Colenbrander |
| 2016/0236087 A1 | 8/2016 | McNeil et al. |
| 2016/0332081 A1 | 11/2016 | Marr et al. |
| 2017/0001111 A1 | 1/2017 | Willette et al. |
| 2017/0001112 A1 | 1/2017 | Gilmore et al. |
| 2017/0001119 A1 | 1/2017 | Perry et al. |
| 2017/0001122 A1 | 1/2017 | Leung et al. |
| 2017/0157512 A1 | 6/2017 | Long et al. |
| 2018/0161675 A1 | 6/2018 | Miron et al. |
| 2019/0076742 A1 | 3/2019 | Lucas et al. |
| 2019/0351334 A1 | 11/2019 | Li et al. |

INTERACTIVE GAMEPLAY PLAYBACK SYSTEM

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

There are a number of websites and resources dedicated to competition among video game players. Some users record videos of gameplay using game applications. The gameplay videos can be shared with other users to show different aspects of gameplay, illustrate user events, completion of difficult tasks, achievements, or other types of events within a game application. The videos can be shared on video upload sites for other users to view. Some users engage in competitions and provide videos for showing completion of a specific gameplay aspect, such as the quickest completion time of a video game level, or other types of events.

SUMMARY OF SOME EMBODIMENTS

The systems, methods, and devices of this disclosure each have several innovative aspects, no single one of which is solely responsible for the all of the desirable attributes disclosed herein.

One embodiment discloses a computing system comprising: computer hardware configured with specific computer-executable instructions to execute a game application, the game application configured to: receive input to initiate a second instance of a game application corresponding to a first instance of the game application, wherein the first instance of the game application is executing on a broadcast computing system; load the game application on the computing system; determine a game identifier associated with the first instance of the game application based, at least in part, on the input received to initiate the second instance; determine a gameplay state associated with the first instance of the game application based, at least in part, on the game identifier of the first instance; generate the determined game state within the second instance of the game application, wherein the generated gameplay state of the second instance operates concurrently with a gameplay state of the first instance; and generate instructions to execute the second instance of the game state within the game application on the computing system.

Another embodiment discloses a computer-implemented method comprising: as implemented by a computing system configured with specific computer-executable instructions, receiving input to initiate a second instance of a game application corresponding to a first instance of the game application, wherein the first instance of the game application is executing on a broadcast computing system; loading the game application on the computing system; determining a game identifier associated with the first instance of the game application based, at least in part, on the input received to initiate the second instance; determining a gameplay state associated with the first instance of the game application based, at least in part, on the game identifier of the first instance; generating the determined game state within the second instance of the game application, wherein the generated gameplay state of the second instance operates concurrently with a gameplay state of the first instance; and generating instructions to execute the second instance of the game state within the game application on the computing system.

Another embodiment discloses a non-transitory computer readable medium comprising computer-executable instructions that, when executed by a computing system, cause the computing system to execute a game application, the game application configured to: receive input to initiate a second instance of a game application corresponding to a first instance of the game application, wherein the first instance of the game application is executing on a broadcast computing system; load the game application on the computing system; determine a game identifier associated with the first instance of the game application based, at least in part, on the input received to initiate the second instance; determine a gameplay state associated with the first instance of the game application based, at least in part, on the game identifier of the first instance; generate the determined game state within the second instance of the game application, wherein the generated gameplay state of the second instance operates concurrently with a gameplay state of the first instance; and generate instructions to execute the second instance of the game state within the game application on the computing system.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION OF EMBODIMENTS

Overview

Figure 1:
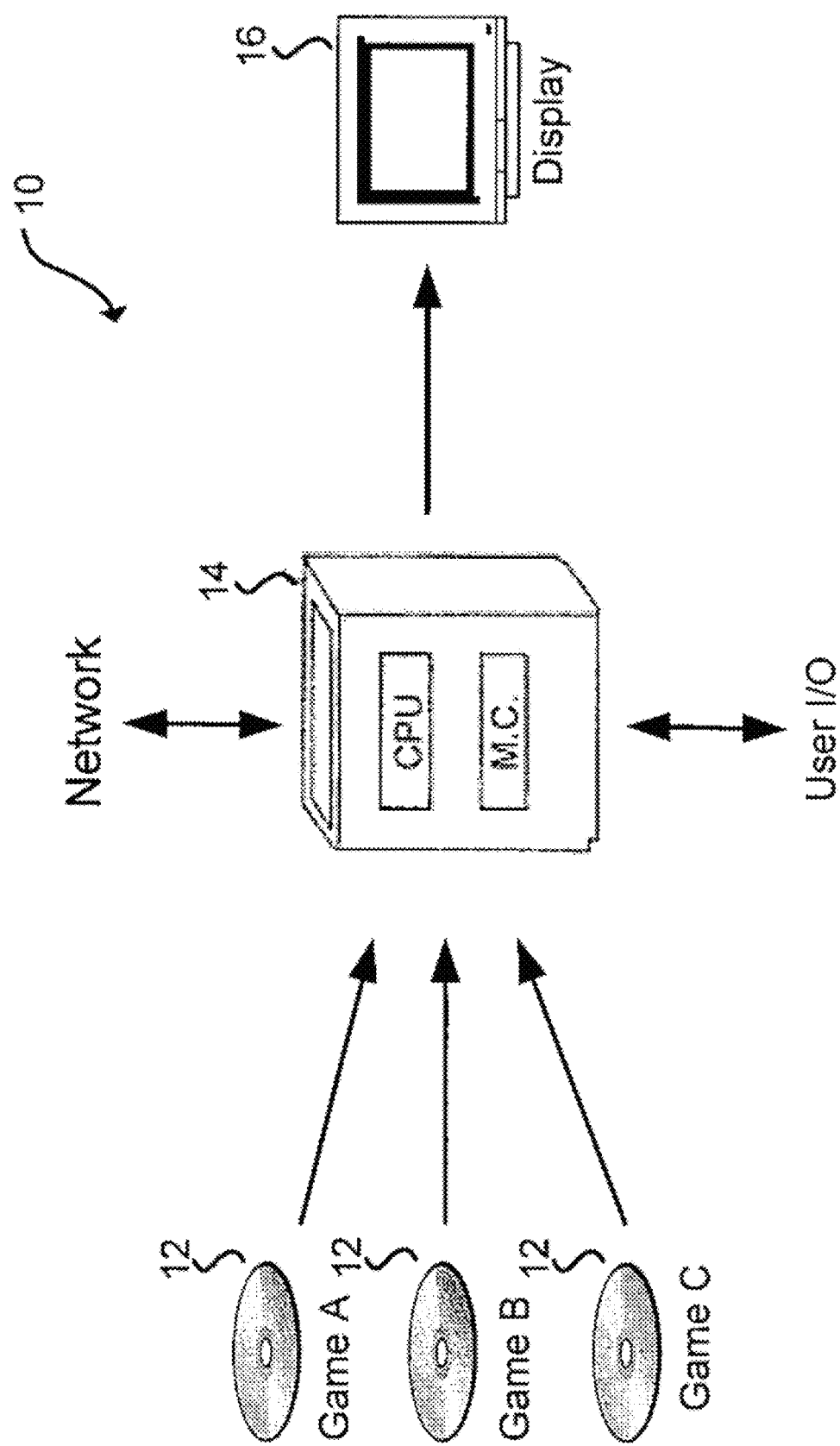
FIG. 1 illustrates an embodiment of a game system.

When comparing gameplay videos, it can be difficult to determine whether two gameplay videos are recreating the same event using the same gameplay parameters. For example, a video recorded by a user may be edited after completion of the gameplay video and prior to uploading the video for other users to view. It which case, it can be difficult to identify when a player is modifying or editing the video. In some cases, it can be difficult for users to determine the "winner" of a specific challenge or feat.

One solution to the above mentioned problem is to provide a video playback system for use within a game application and/or other interactive computing environments. The video playback system, also referred to as a gameplay playback system, can be used to capture gameplay during execution of a game application. The captured gameplay video can be processed and stored within the game application or in a network accessible location. The gameplay footage can store gameplay state parameters that can be used to generate the game state presented by the gameplay video at time intervals within the gameplay video.

For example, a user may setup a specific challenge or event within a game and record gameplay session. Gameplay state parameters can be stored within the video as the video is recording. The gameplay state parameters can be used to recreate the state of the game so that another player can repeat the specific challenge or event. When a second player watches the video, the player can use the video to recreate the event at any point in time within the video.

The gameplay state parameters can include a subset of the total parameters that are used to recreate the game state within the game. For example these game play parameters can include the position of a vehicle within a racing game, the positions of other vehicles, other characteristics such as momentum, speed or location of other artifacts within the game that could affect gameplay in a localized area.

In some embodiments, each of these identified gameplay state parameters can be saved at time intervals during the recording of the video. At each interval the system can record values associated with each of a defined set of gameplay parameters. In one embodiment, the state parameter data can be stored within a data stream of the video file. In some embodiments, the state parameter data can be stored as data separate from the video, such as a file linked to the video stream. The state parameter data can provide independent points for recreation of the game state of the video, which can allow users to recreate game states at a plurality of points within a gameplay video.

While specific embodiments and example applications of the present disclosure will now be described with reference to the drawings, these embodiments and example applications are intended to illustrate, and not limit, the present disclosure. Specifically, while various embodiments and aspects of the present disclosure will be described with regard to illustrative components of a video playback system, one or more aspects of the present disclosure can be applied with regard to different types or configurations of the video playback system or combinations thereof.

Video Game System Embodiments

FIG. 1 illustrates a game system 10 for providing one or more games to a user according to embodiments of the present disclosure. The system 10 includes one or more game media 12 (game A, game B, game C), a game device 14, and a display 16.

The game media 12 may include one or more game applications that may be used or executed by game device 14 to involve a user in a game. The game medium 12 can store logic for execution of a game by the system 10. In one embodiment, the game application provided for execution by the game device 14 is an electronic video game. Games can be individually stored on physical media, such as compact disk read-only memories (CD-ROMs), digital versatile disks (DVDs), game cartridges, flash drives, or other storage media. A game, such as game A, can be inserted in, coupled to, or in communication with the game device 14 so that the game device 14 can read all or part of a game application and/or related game data found on game media 12. In some instances, game applications can be at least partially stored on the game device 14, or accessible from another computing system, such as over a network.

The game device 14 is a computing device that includes one or more processors, such as central processing units (CPUs), graphics processing units (GPUs), and data storage combined or in separate elements. In some embodiments, the game device 14 can be a specialized computing device created for the purpose of executing game applications. The games executed by the game device 14 may be created using a particular application programming interface (API) or compiled into a particular instruction set that may be specific to the game device 14. In other cases, the game device 14 may be a general purpose computing device capable of executing game applications and non-game applications. For example, the game device 14 may be a laptop or desktop computer. The game device 14 may also be connected to a network and game device 14 may access games that are not included on game media 12 by, for example, accessing another computing system over the network. In some such embodiments, game A, game B, and/or game C may be accessed through the network, in whole or in part, and may not be individually stored on game media 12. To allow a user to select from a plurality of available games available on game media 12 or via the network, a display 16 might present a list of the games provided by game applications on game media 12.

A game application may also be referred to as a game code and/or a game program. A game application should be understood to include software code that a game device 14 can use to provide a game for a user to play. A game application might comprise software code that informs a game device 14 of processor instructions to execute, but might also include data used in the playing of the game, such as data relating to constants, images and other data structures created by the game developer including prerecorded animation data. A user may interact with the game application and game device 14 through user input/output (I/O) devices.

Figure 2:
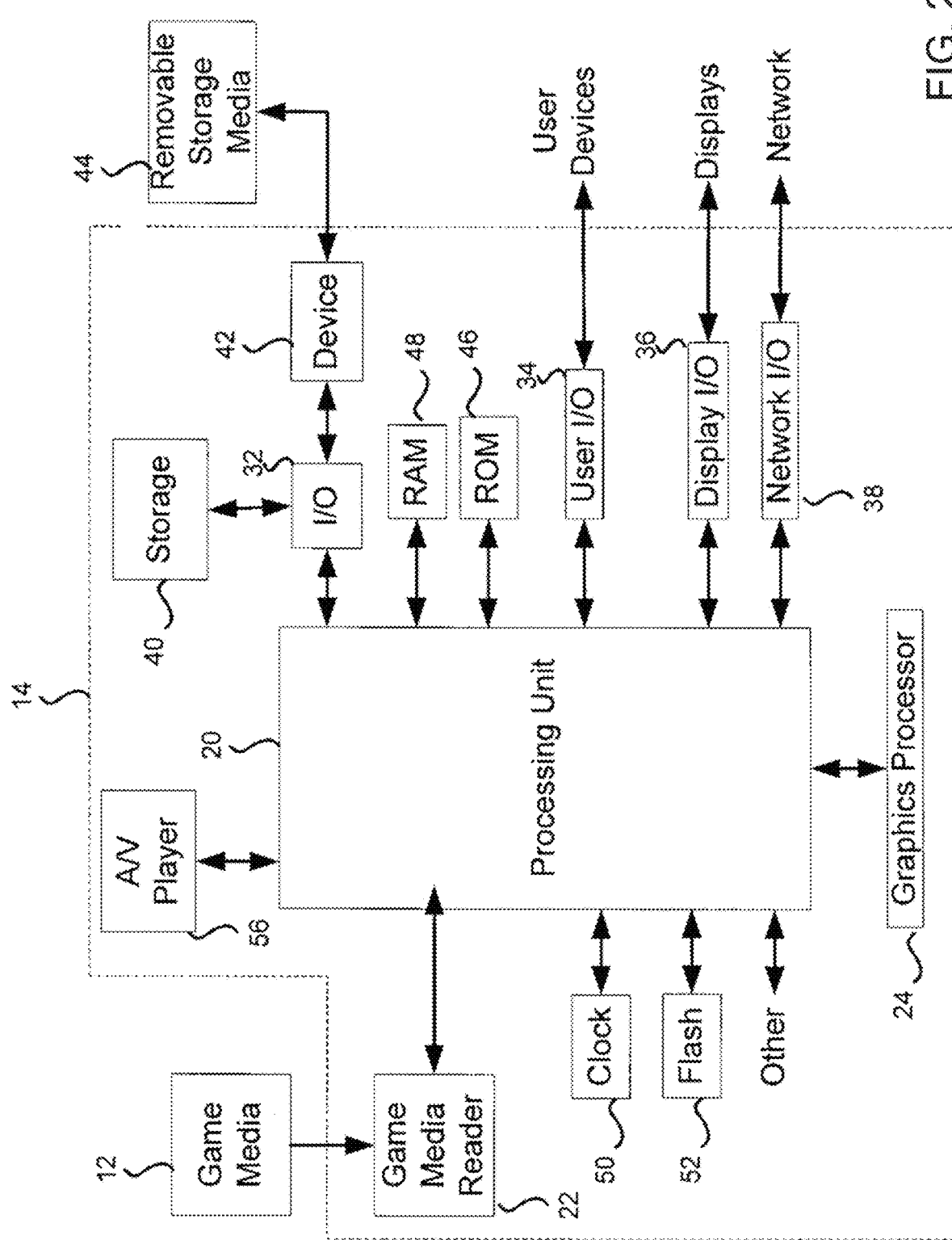
FIG. 2 illustrates an embodiment of game device.

FIG. 2 illustrates an embodiment of game device 14 according to the present disclosure. Other variations of the game device 14 may be substituted for the examples explicitly presented herein, such as removing or adding components to the game device. As shown, the game device 14 includes a processing unit 20 that interacts with other components of the game device 14 and also external components to game device 14. A game media reader 22 is included that communicates with game media 12. Game media reader 22 may be an optical disc reader capable of reading optical discs, such as CD-ROM or DVDs, or any other type of reader that can receive and read data from game media 12.

Game device 14 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the game device 14 may include a discrete graphics processor 24 that is separate from the processing unit 20. In some such cases, the graphics processor 24 may have separate RAM from the processing unit 20. Game device 14 might be a handheld video game device, a dedicated game console computing system, a general-purpose laptop or desktop computer, a smart phone, a tablet, a car console, or other suitable system.

Game device 14 also includes various components for enabling input/output, such as an I/O 32, a user I/O 34, a display I/O 36, and a network I/O 38. I/O 32 interacts with storage element 40 and, through a device 42, removable storage media 44 in order to provide storage for game device 14. Processing unit 20 can communicate through I/O 32 to store data, such as game state data and any shared data files. In addition to storage 40 and removable storage media 44, game device 14 is also shown including ROM (read-only memory) 46 and RAM 48. RAM 48 may be used for data that is accessed frequently, such as when a game is being played.

User I/O 34 is used to send and receive commands between processing unit 20 and user devices, such as game controllers. Display I/O 36 provides input/output functions that are used to display images from the game being played. Network I/O 38 is used for input/output functions for a network. Network I/O 38 may be used during execution of a game, such as when a game is being played online or being accessed online.

Display output signals produced by display I/O 36 comprising signals for displaying visual content produced by game device 14 on a display device, such as graphics, user interfaces, video, and/or other visual content. Game device 14 may comprise one or more integrated displays configured to receive display output signals produced by display I/O 36. According to some embodiments, display output signals produced by display I/O 36 may also be output to one or more display devices external to game device 14, such a display 16.

The game device 14 can also include other features that may be used with a game, such as a clock 50, flash memory 52, and other components. An audio/video player 56 might also be used to play a video sequence, such as a movie. It should be understood that other components may be provided in game device 14 and that a person skilled in the art will appreciate other variations of game device 14.

Program code can be stored in ROM 46, RAM 48 or storage 40 (which might comprise hard disk, other magnetic storage, optical storage, other non-volatile storage or a combination or variation of these). In a common arrangement, part of the program code is stored in ROM that is programmable (ROM, PROM, EPROM, EEPROM, and so forth) and part of the program code can be stored on removable media such as game media 12 (which can be a CD-ROM, cartridge, memory chip or the like, or obtained over a network or other electronic channel as needed). In general, program code can be found embodied in a tangible non-transitory signal-bearing medium.

RAM 48 (and possibly other storage) is usable to store variables and other game and processor data as needed. Typically, RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the game device 14 is turned off or loses power.

As game device 14 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

Figure 3:
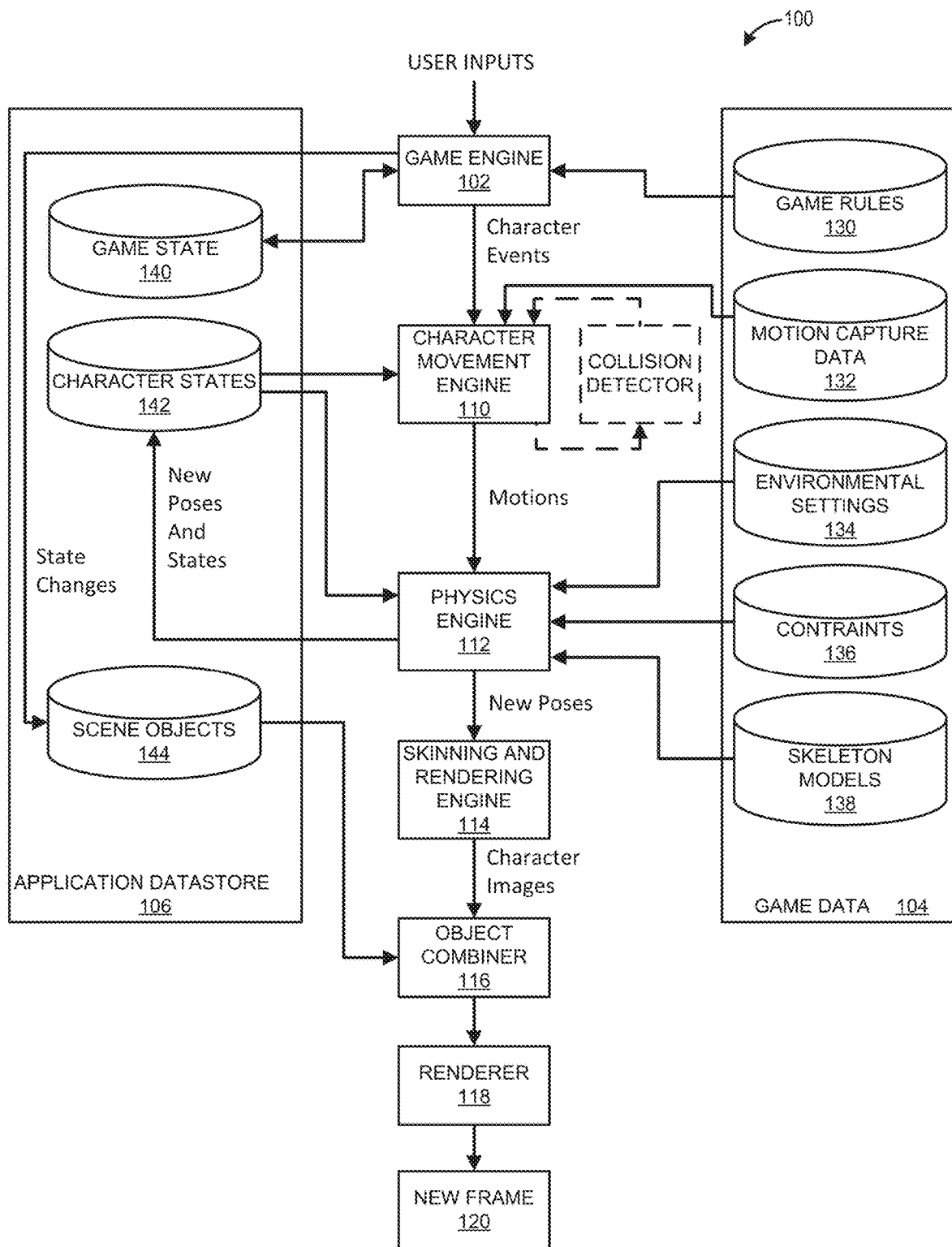
FIG. 3 illustrates an embodiment of elements of a game system.

FIG. 3 illustrates an embodiment of some elements of game system 10 in more detail, especially those involved in execution of gameplay within a game application. The game device 14 provides for user input to control aspects of the game according to game rules 130. Game rules 130 might be specified in instruction form on game media 12. Examples of game rules 130 include rules for scoring, possible inputs, actions/events, movement in response to inputs, and the like. Other components can control what inputs are accepted and how the game progresses, and other aspects of gameplay. The elements in FIG. 3 illustrate elements used for generating and rendering animation within the game based on various inputs.

As shown in FIG. 3, by system 100, user inputs and game code/data may be used to generate display video. The game system also handles playing the game and presenting corresponding audio output. The description of FIG. 3 is focused on generating frames of display video for the game. A game engine 102 receives the user inputs and determines character events, such as actions, collisions, runs, throws, attacks and other events appropriate for the game.

The character events are conveyed to a character movement engine 110 that determines the appropriate motions the characters should make in response to the events and passes those motions on to a physics engine 112. Physics engine 112 determines new poses for the characters and provides those new poses to a skinning and rendering engine 114. Engine 114 in turn provides character images to an object combiner 116 to combine animate, inanimate and background objects into a full scene. The full scene is conveyed to a renderer 118, which generates a new frame 120 therefrom.

Game code/data 104 is shown comprising game rules 130, prerecorded motion capture poses/paths 132, environmental settings 134, constraints 136 (such as strength and velocity constraints), and skeleton models 138. The device executing the game might have memory 106 for game state 140, character states 142 and scene object storage 144. Character states 142 can comprise storage for a current pose of characters being animated.

During operation, the game engine 102 reads in game rules 130 and considers game state 140 to arrive at character events. Character movement engine 110 reads in prerecorded poses/paths 132 as well as character states 142. An optional collision detector process can derive the desired motions for characters based on collisions. Motions might be expressed as a set of external forces, target poses and the like. As needed, character movement engine 110 may also use other data elements shown, such as skeleton models 138, also referred to as rigs. Rigs are often used in character animations. A typical rig may comprise a collection of character components, such as a skeletal structure and a mesh to be skinned over the skeletal structure. A typical rig comprises a skeletal structure for a character and includes a plurality of degrees of freedom. A rig may also comprise a set of animation controls that enable an animator to move the various components of the character in order to create motion in an animation. Character movement engine 110 might also introduce character movements for randomness, personality, and so forth.

The physics engine 112 has as its inputs the skeleton models of various characters, environmental settings 134, character states such as current poses (for example, positions of body parts expressed as positions, joint angles or other specifications), and velocities (linear and/or angular) of body parts and motions provided by character movement engine 110, which can be in the form of a set of force/torque vectors for some or all body parts. From this information, physics engine 112 generates new poses for the characters using rules of physics and those new poses can be used to update character states 142 and are also provided to rendering engine 114. Where invisible skeleton models are used, character states 142 might contain current position of visible "graphics" of characters as well as the invisible rag-doll skeleton characters.

The skinning and rendering engine 114 takes into account the surfaces, colors and textures of the body parts of posed characters and renders character images. Object combiner 116 can then combine the character images with inanimate and background objects obtained from scene objects store 114 to provide a complete scene to renderer 118.

Networked Computing Environment

Figure 4:
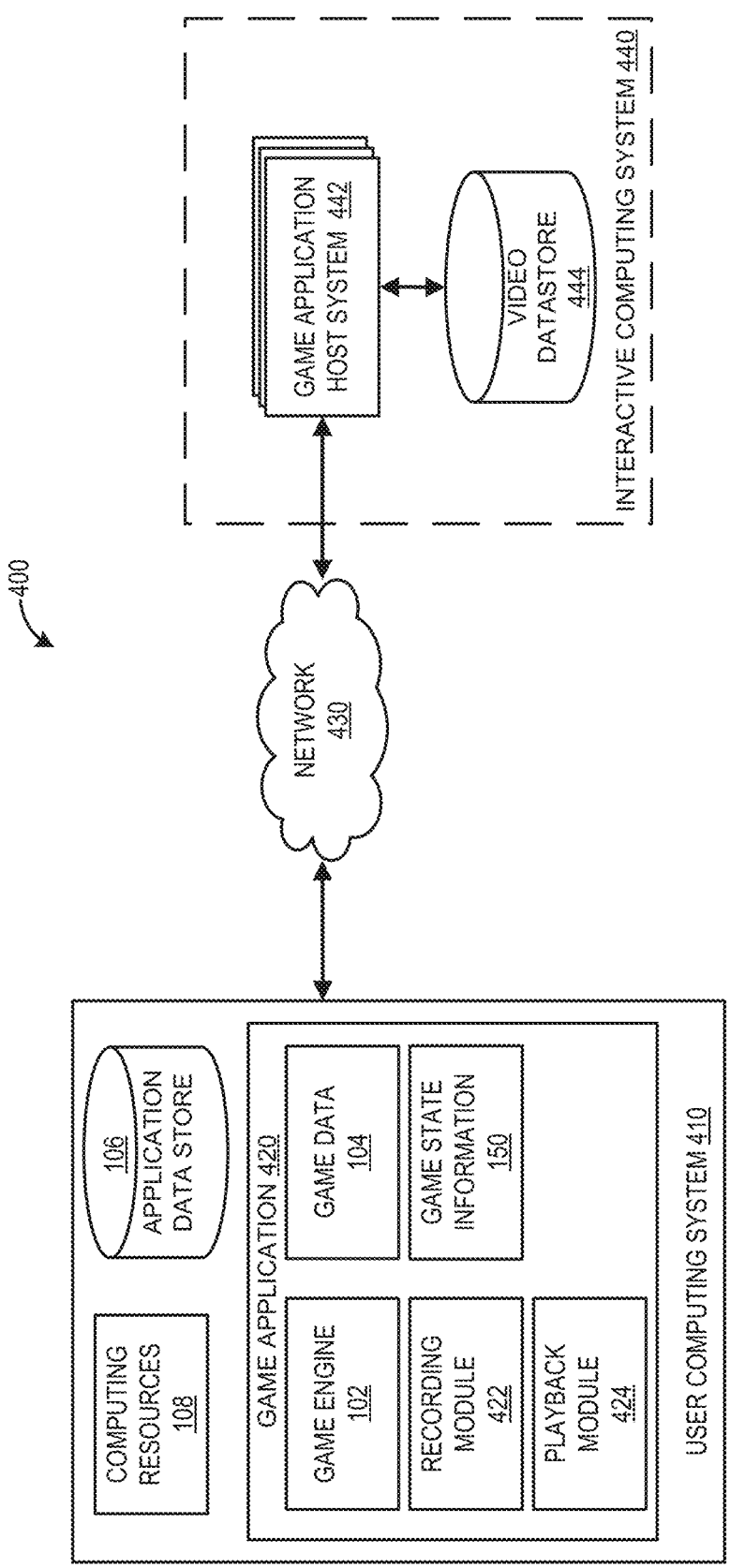
FIG. 4 illustrates an embodiment of a networked computing environment that can implement one or more embodiments of a gameplay playback system.

FIG. 4 illustrates an embodiment of a networked computing environment 400 that can implement one or more embodiments of a gameplay playback system. The networked computing environment 400 can include one or more user computing systems 410 and one or more interactive computing systems 440. To simplify discussion, but not to limit the present disclosure, FIG. 4 illustrates one user computing system 402 and one interactive computing system 440. The user computing system 410 may communicate via a network 430 with the interactive computing system 440. Although only one network 430 is illustrated, multiple networks 430 may exist.

Network

The network 430 can include any type of communication network. For example, the network 430 can include one or more of a wide area network (WAN), a local area network (LAN), a cellular network, an ad hoc network, a satellite network, a wired network, a wireless network, and so forth. Further, in some cases, the network 430 can include the Internet.

User Computer System

The user computing system 410 may include hardware and software resources 108. The computing resources 108 may be equipped with networking equipment and network software applications (for example, a web browser or mobile application) that facilitate communications via a network 430 (for example, the Internet) or an intranet. The user computing system 410 may have varied local computing resources 108 such as central processing units and architectures, memory, mass storage, graphics processing units, communication network availability and bandwidth. Further, the user computing system 410 may include any type of computing system. For example, the user computing system 410 may be implemented as one or more of the computing devices 14 illustrated in further detail in FIGS. 1 and 2.

Game Application

The user computing system 410 can execute a game application 420 based on software code stored at least in part in the application data store 106. The game application 420 may also be referred to as a videogame, a game, game code, and/or a game program. A game application 420 should be understood to include software code that a computing device 410 can use to provide a game for a user to play. A game application 420 may comprise software code that informs a computing device 410 of processor instructions to execute, but may also include data used in the playing of the game, such as data relating to constants, images, and other data structures. In the illustrated embodiment, the game application 420 includes a game engine 102, game data 104, game state information 150, a recording module 422 and a playback module 424. The recording module 422 and the playback module 424 can be used to implement various aspects of the gameplay playback system.

The user computing system 410 is capable of executing a game application 420, such as a video game, that may be stored and/or executed in a distributed environment. For example, the user computing system 410 may execute a portion of a game and the interactive computing system 440, or a game application host system 442 of the interactive computing system 440, may execute another portion of the game. As one example, the game can include a client portion executed by the user computing system 410 and a server portion executed by one or more application host systems 442. In some embodiments, the application 420 can include a distributed application or an application that includes a portion that executes on the user computing system 402 and a portion that executes on at least one of the application host systems 442. The game application may be any type of game, including multiplayer games (such as, for example, massively multiplayer online role-playing games (MMORPG), multiplayer first person shooters (FPS), mobile online battle arenas (MOBA), racings games, sports games, and other multiplayer games) and single player games (such as for example, role playing games (RPG), adventure games, puzzle games, and other single player games).

Game Engine

The game engine 102 can be configured to execute aspects of the operation of the game application 420 within the computing device 410. Execution of aspects of gameplay within a game application can be based, at least in part, on the user input received, the game data 104, and game state information 150. The game engine 102 can execute gameplay within the game according to the game rules. Examples of game rules can include rules for scoring, possible inputs, actions/events, movement in response to inputs, and the like. Other components can control what inputs are accepted and how the game progresses, and other aspects of gameplay. The game engine 102 can receive the user inputs and determine in-game events, such as actions, jumps, runs, throws, attacks, and other events appropriate for the game application 420. During runtime operation, the game engine 102 can read in game data 104 and game state information 150 to determine the appropriate in-game events.

Game Data

The game data 104 can include game rules, prerecorded motion capture poses/paths, environmental settings, environmental objects, constraints, skeleton models, tutorial information, route information, and/or other game application information. At least a portion of the game data 104 can be stored in the application data store 106. In some embodiments, a portion of the game data 104 may be received and/or stored remotely, such as in a remote data store (not shown) associated with the interactive computing system 440. In such embodiments, game data may be received during runtime of the game application.

Game State Information

During runtime, the game application 420 can store game state information 150, which can include a game state, character states, environment states, scene object storage, route information and/or other information associated with a runtime state of the game application 420. For example, the game state information 150 can identify the state of the game application 420 at a specific point in time, such as a character position, character orientation, character action, game level attributes, and other information contributing to a state of the game application. The game state information can include dynamic state information that continually changes, such as character movement positions, and static state information, such as the identification of a game level within the game. In some embodiments, at least a portion of the game state information can be updated on a periodic basis, such as multiple times per second. In some embodiments, the game state information can be updated on an event-based basis.

Recording Module

In some embodiments, the recording module 422, in some implementations, can be configured to implement recording of gameplay videos with embedded state parameters by the game application 420. The recording module 422 can include an identification of a defined set of state parameters that are stored during recording of a gameplay video. The state parameters can be stored within the video file, in a separate file, or in a separate location such as a network-based data store. The defined set of state parameters can be a subset of the total state parameters used by the game application to define a game state within the game environment. In some embodiments, the defined set of state parameters can be a minimum number of state parameters required for creation of a gameplay state. In some embodiments, the recorded state parameters can be limited to state parameters that influence the actions of a player character within the game. In some embodiments, the one or more parameters may be preselected by the game distributor, the user, or others.

As used herein, the term "player character" refers to a virtual entity that is controlled by a user. The player character can refer to any entity controlled by a user, including, but not limited to, a person, a vehicle, a group of people, a team, an object or any other entity.

In some embodiments, the defined parameters include state parameters that are used to generate a game state within the game application. Some examples of state parameters include positional parameters (such as, for example, momentum, character position, proximity to other characters, and the like), game environment parameters (such as, for example, the state of components within the game environment, game level, camera position, position of items, and the like), player character parameters (such as, for example, player items, player character level, player character attributes and skills, and the like), non-player character parameters (such as, for example, non-player character position, proximity to the player, activity within the game state), and other types of state parameters for generating a game state.

The parameters can be selected and defined according to the specific game application. Each game application can have different parameters that are recorded and used for generation of a game state. At a defined time interval, the values associated with each defined state parameter are recorded. In some embodiments, the recording module 422 dynamically selects state parameters based on the state of the game at the time of recording. For example, the number of defined state parameters can vary dependent upon the state of the game. In some embodiments, the defined set of state parameters are the same regardless of the current state of the game. In some embodiments, all of the state parameters are stored at each time interval.

In some embodiments, the recording module 422 can determine the frequency at which the state parameters are recorded. In some embodiments, the frequency can be determined by a developer, a user, or others. The defined time interval between recording events can be periodic. For example, the defined set of state parameters can be recorded every second, every two seconds, every 500 milliseconds, or any other defined time period. Each recorded dataset of state parameters can be independent of the other recorded datasets, such that the dataset does not rely on a previous dataset recreate a game state. In some embodiments, the system can utilize multiple datasets to recreate a game state. An embodiment of the process for recording state parameters is discussed below with respect to FIG. 7.

Playback Module

The playback module 424, in some implementations, can be configured to recreate a game state based on the state parameters stored within a gameplay video. The playback module 424 can create the game state based, in part, on the stored values associated with the defined set of state parameters and using additional information associated with the game application 420. The additional information can be used to fill in the information that is not stored in the gameplay video. Using information that is not specific to the saved game state can result in variations in certain aspects of the game state. For example, the fans in a stadium, the weather, the colors, or other elements of the game state may differ from the original state. Advantageously, in some embodiments, the defined state parameters can be configured to store only the information that is necessary to create a game state that affects gameplay characteristics for the user. In some embodiments, the playback module can synchronize video, audio, and other data associated with a gameplay vide. For example, the video, audio, and game state data can be stored in different locations such as separate data stores, and a reference identifier associated with the gameplay video can be used to access the associated gameplay video data, such as video, audio, game state data, and so forth.

Interactive Computing System

The interactive computing system 440 may include one or more computing systems configured to execute a portion of the application 420. The interactive computing system 440 may include one or more computing systems enabling multiple users to access a portion of the application 420. In some embodiments, a game application host system 442 can host and maintain a data store 444 configured to store information associated with the game application host systems 442 and the interactive computing system 440. The datastore 444 can include gameplay videos for the game application 420. The game application host system 442 can make the videos available to the game application over the network 430. The game application host system 442 can process and categorize the video content generated by individual game applications 420.

Application Host System

The interactive computing system 440 may enable multiple users or computing systems to access a portion of the game application 420 executed or hosted by the application host system 440. In some embodiments, the host application system 442 may execute a hosting system for executing various aspects of a game environment. For example, in one embodiment, the game application 420 can record the location and/or status of characters within the game environment. In some embodiments, the game application 420 may be a single player game in which the application host system 442 may provide additional functionality when communicating with the instance of the game application 420. In some embodiments, the application host system 440 can provide a dedicated hosting service for hosting multiplayer game instances or facilitate the creation of game instances hosted by user computing devices. In some embodiments, the host application system 442 can provide a lobby or other environment for users to virtually interact with one another.

User Interface

Figure 5:
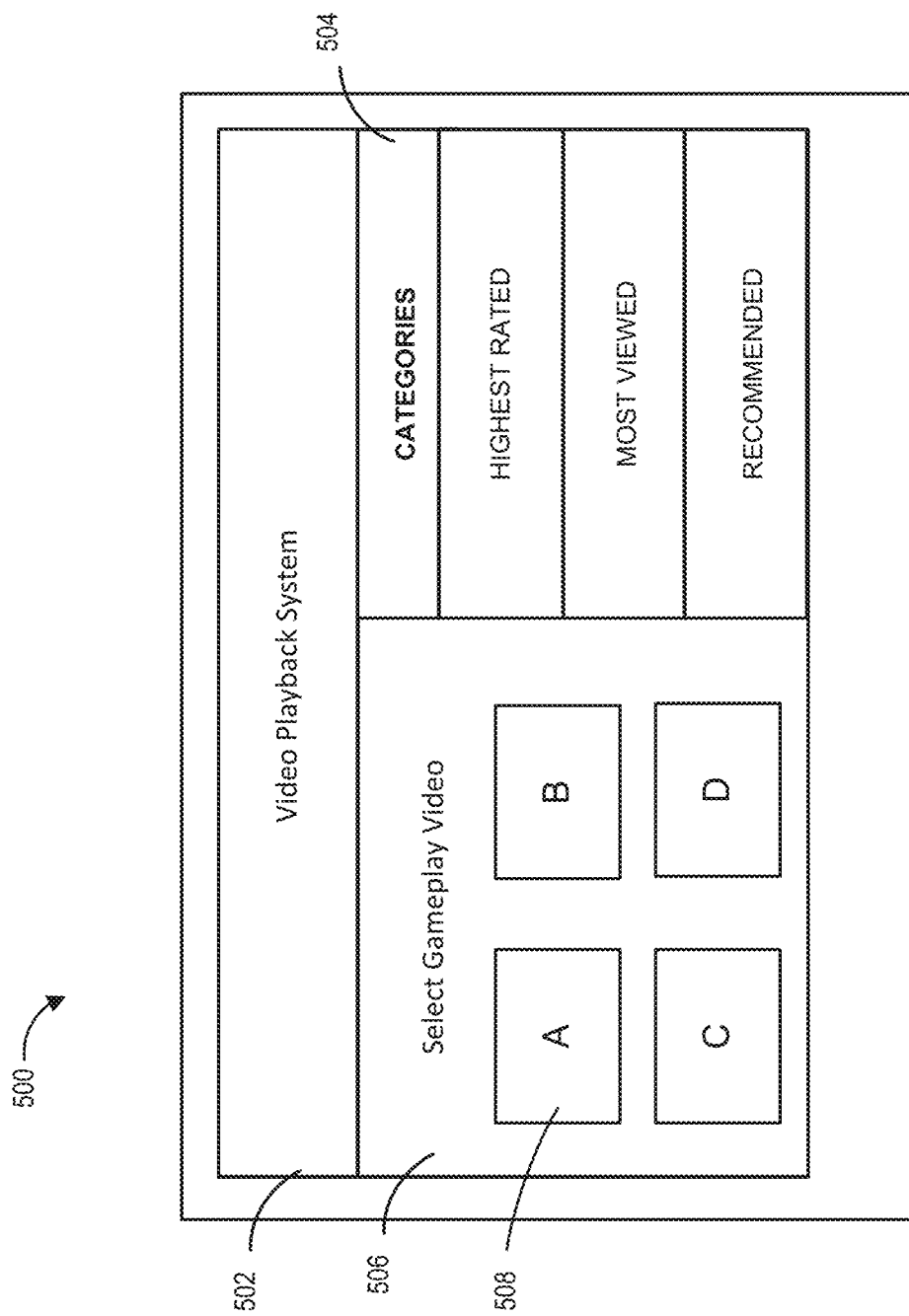
FIG. 5 illustrates an embodiment of a user interface for implementing a gameplay playback system.

FIG. 5 illustrates an embodiment of a user interface 500 for implementing a gameplay playback system. The user interface 500 can be accessible via a game application, such as game application 420. For example, the user interface 500 can be accessible by a user executing the game application. The game application can provide a front end for a user to access a plurality of gameplay videos. The videos can be other user's videos and/or the user's own videos.

This embodiment of the user interface 500 includes a header 502 identifying the video playback system, a selection screen 506 including a plurality of videos 508 for the user to select. The user interface can include categories 504 for sorting the videos based on specific criteria. The videos can include tags or other identifiers that can be used to identify the videos and facilitate searching for specific types of videos. The categories can be based on ratings, viewing, recommendations, subject matter, or other criteria. The user interface 500 can include functionality for the user to search for specific videos. Users can search for videos based on game specific criteria, such as by game names, game level, user names, and so forth. The user interface can provide the user with an interface control that allows the user select videos for playback.

In some embodiments, users can receive rewards for uploading, viewing, playing, and otherwise interacting with the gameplay videos in the gameplay playback system. The rewards can be generated in the form of an in-game currency, experience points, currency credits, or other incentives that can be used, for example, to encourage the use and creation of content. Some rewards can be based on the popularity of user created videos. For example, the rewards could be based on the number of views, the number of likes, number of shares, or response videos, or other metrics for evaluating popularity and quality of video uploads. For example, if a user's video gets to a certain number of shares, the user may receive an achievement, a profile badge, or other recognition.

The videos can be stored locally on a user system, stored on a remote server, or a combination. The location of the videos can depend on the device characteristics, device settings, user settings, or other factors. In some embodiments, the videos are accessible via a generic video player network location (such as YouTube®) or via a mobile application.

Playback Example of a Gameplay Video

Figure 6A:
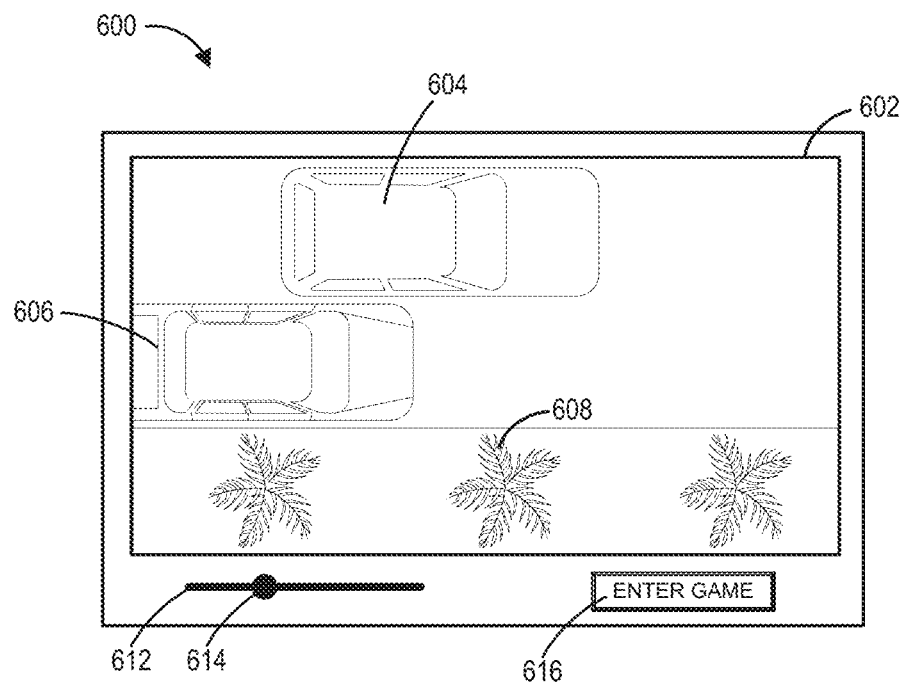
FIGS. 6A and 6B illustrate an embodiment of interface for playback of a gameplay video.
Figure 6B:
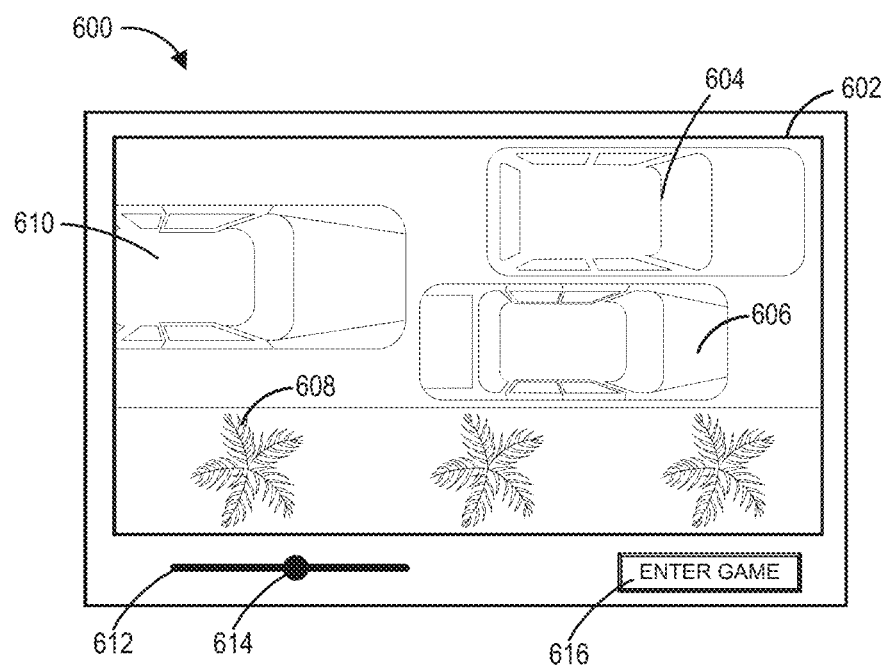

FIGS. 6A and 6B illustrate an embodiment of interface 600 for playback of a gameplay video. FIG. 6A illustrates the playback of the video at a first point in time, $T_1$, and FIG. 6B illustrates playback of the video at a second point in time, $T_2$. The user interface 600 includes a viewer 602, and controls associated with the operation of the viewer, including a timeline of the video 612 and a control 614 that displays the current time of the video or an indication of the current time relative to the entire time of the video. The control 614 can be manipulated by the user to select points in time within the video. The user interface includes a control 616 that the user can select to load the game at a selected point in time. The viewer illustrates the current game state. In FIG. 6A, at $T_1$, the viewer is displaying the player vehicle 604, a non-player vehicle 606, and inanimate objects within the game, such as the tree 608. In FIG. 6B, at $T_2$, the viewer is displaying the player vehicle 604, a non-player vehicle 606, a second non-player vehicle 610, and inanimate objects within the game, such as the tree 608. Other interface objects can also be used for the user interface.

At $T_1$, $T_2$, or at other points in time within the video, the user can select the control 616 to enter the game. When the user selects the enter game control 616, the playback system identifies the stored state parameters associated with the selected point in time, which can be before or after the exact point in time selected by the user, or at the closes time interval where parameters have been stored.

The values of the defined set of state parameters stored within the video can be used by the game system to recreate the game state as it is displayed within the video. At each time interval, the one or more stored values for the defined state variables can be different. The game application loads and uses the stored values to create the game state displayed in the video at the time interval that the user selected. Generally, some state parameters have different values at each time period. Generally, a massive amount of data would be needed to store all of the gameplay parameters at each interval. As such, the defined state parameters may only represent a portion of the total state parameters that are used to recreate the game state. The portion of the total gameplay parameters that are recorded are specifically defined such that the game state can be created with the defined parameters. The game application can provide the additional information necessary to recreate the game state without all of the game state parameters. Accordingly, there can be some variance between the actual gameplay and the recreated gameplay. In some embodiments all of the gameplay parameters can be recorded and can be used to create as near as possible an identical recreation of the gameplay state of the game.

With reference to FIG. 6A, an example of gameplay is illustrated at $T_1$. Exemplary state parameters for this example may include the position of the player vehicle 604, the position of the non-player vehicle 606, the speed of each vehicle, the types of vehicles, and the level within the game. The game application can use the information to recreate the vehicles, their speed, and position within the game level. In order to do generate the determined game state within the game application, the game engine can use additional state parameters that were not recorded by the video. For example, the defined state parameters may not include objects that are unnecessary for generation of the determined game state. Each game application can have a unique set of defined state parameters, relative to other game applications, that are used to create the game state displayed within the video. The game engine can use game state parameters and game rules associated with the defined state parameters.

Gameplay Capture Process

Figure 7:
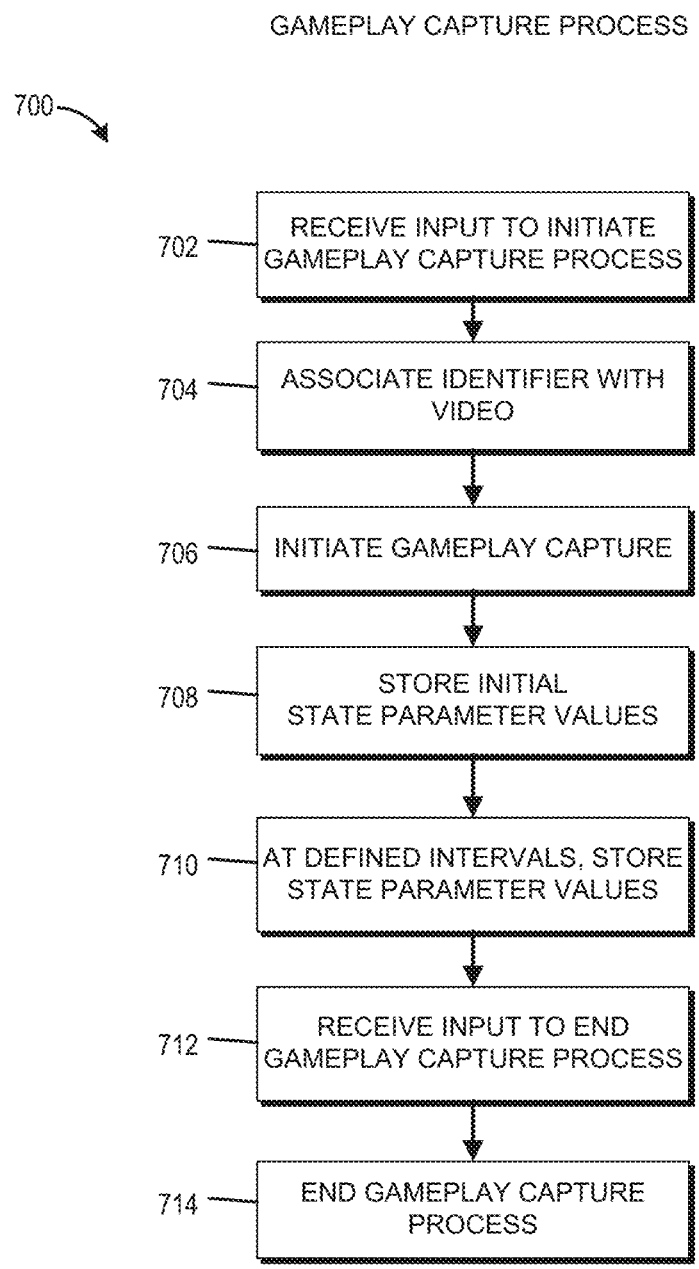
FIG. 7 illustrates a flowchart of an embodiment of a process for recording a gameplay video with embedded state parameters.

FIG. 7 illustrates a flowchart of an embodiment of a process 700 for recording a gameplay video associated with state parameters. The process 700 can be implemented by any system that can record gameplay within an application. For example, the process 700, in whole or in part, can be implemented by a game application 420, or a recording module 422, the game engine 102, among others. Although any number of systems, in whole or in part, can implement the process 700, to simplify discussion, the process 700 will be described with respect to these particular systems.

At block 702, the system can receive input to initiate a gameplay capture process. The gameplay capture process can be started by a user providing a command to initiate the capture process. In some embodiments, the input to initiate the capture process can be generated by the system based on triggers generated with the game. The triggers can be based on events or actions performed within the game application, such as performing a specific achievement or completing a specific segment of the game. In some embodiments, the trigger can be a user defined trigger (for example, a user can set a user preference to automatically record achievement), defined by the game application, set by an external system, a system administrator, and the like. The trigger can provide an input to start recording for a defined time period prior to the associated with the event and can include time before and after it is recorded.

At block 704, an identifier can be associated with the captured video. The identifier can be a unique identifier that can be used to identify the video and the stored state data. The identifier can be used to associate the video with the state data when the video file and state data are stored in separate locations. At block 706, gameplay capture is initiated based on the received input.

At block 708, the initial set of state parameters values are stored. The state parameters can be a subset of the total number of state parameters of the game state. The subset can be defined based on the individual game application. Each game application can utilize different state parameters for creating a game state. The set of state parameters can include one or more parameters including positional parameters (such as, for example, momentum, character position, proximity to other characters, and the like), game environment parameters (such as, for example, the state of components within the game environment, game level, camera position, position of items, and the like), player character parameters (such as, for example, player items, player character level, player character attributes and skills, and the like), non-player character parameters (such as, for example, non-player character position, proximity to the player, activity within the game state), and other types of state parameters for generating a game state. The state parameter values can be stored in a data stream associated with the video. In some embodiments, the state parameter values are stored separately from the video stream, but can be later linked to or associated with the corresponding video frames.

At block 710, the values of the state parameters are stored at defined intervals. The intervals can be time-based or event-based. At each time-based or event-based interval the values associated with the state parameters are stored. As mentioned previously, the values can be stored in a data stream with the video or in a separate location. The time-based intervals can be periodic, such as every second, every two seconds, 500 milliseconds, or other time period. In some embodiments, the time interval may vary, for example, the certain types of gameplay may increase or decrease the frequency of the time-based interval, such as sequences of quick action or events. The event-based interval can be at irregular time intervals. For example, the event-based interval can be triggered based on triggering events or changes to values of specific state parameters. For example, in a turn-based game, the event-based interval may only occur at the end of each turn. The game application can define when the event-based intervals trigger the storage of the values of the state parameters.

The system continues to store the state parameter values at the defined time intervals until the system receives an input to end the gameplay capture process at block 712. Upon receiving the input to end the gameplay capture process, the gameplay capture process ends at block 714. The system can process and save the video file with the embedded state parameters. In some embodiments, the video is saved locally on the computing system. In some instances, the video can be uploaded to a network based storage location, such as the video data store 444. In some embodiments, the videos can be stored locally and uploaded to a video data store 444. The videos can be indexed for better searching.

Gameplay Playback Process

Figure 8:
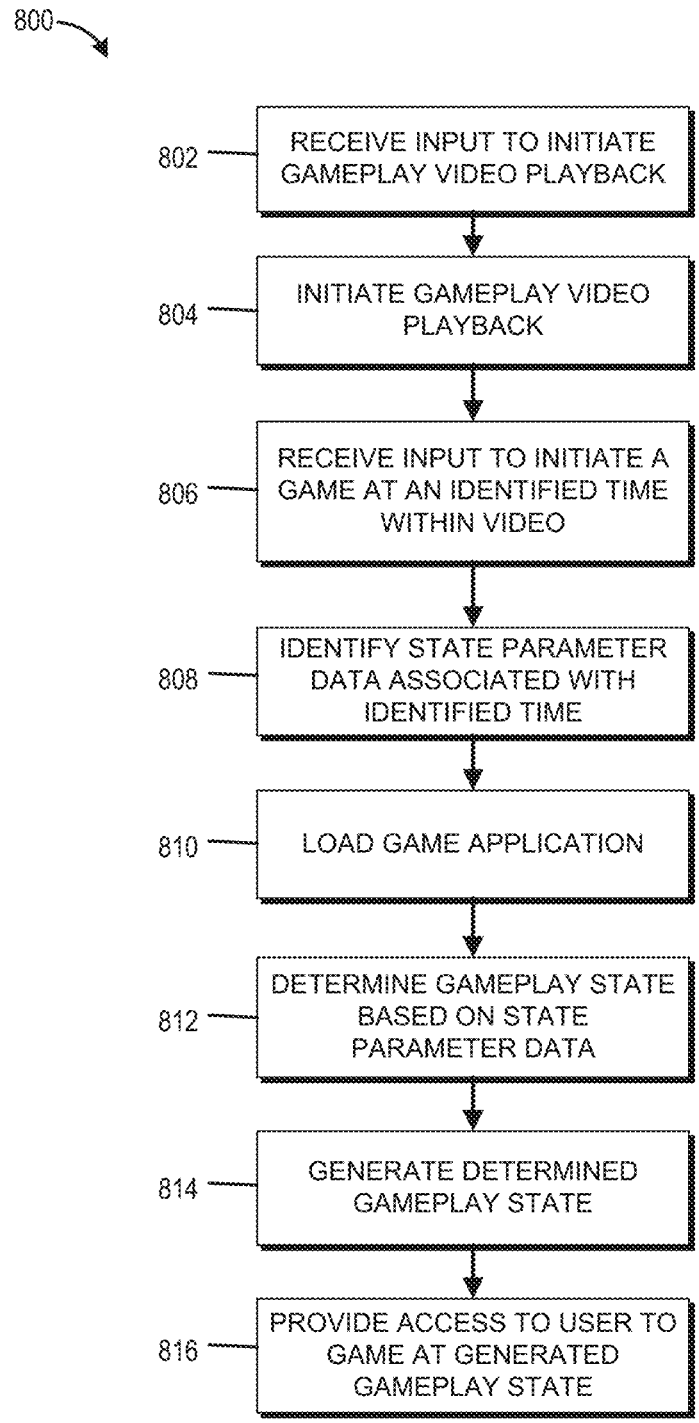
FIG. 8 illustrates a flowchart of an embodiment of a process for creating a gameplay state based on a subset of state parameters associated with an identified game state within a gameplay video.

FIG. 8 illustrates a flowchart of an embodiment of a process 800 for creating a gameplay state based on a subset of state parameters associated with an identified game state within a gameplay video. The process 800 can be implemented by any system that can generate gameplay within an application based on stored state parameters for the application. For example, the process 800, in whole or in part, can be implemented by a game application 420, or a playback module 424, among others. Although any number of systems, in whole or in part, can implement the process 800, to simplify discussion, the process 800 will be described with respect to these particular systems.

At block 802, the system can receive user input to initiate gameplay video playback. The input can come from a user interacting with a user interface such as the user interface illustrated in FIG. 5. At block 804, the system can initiate gameplay video playback, such as illustrated in FIGS. 6A and 6B.

At block 806, the system can receive user input to start the game at the same point or at a point near that of the video. At block 808, the system identifies state parameter data associated with the identified time. The state parameter data associated with the video can be the state parameter data that is prior to or after the identified time, or closest to the identified time. The identified state parameter data can be before or after the identified time.

At block 810, the system can load the game application. After the game application is loaded, at block 812, the system can determine a gameplay state based on the state parameter data. The state parameter data includes a set of state parameters for generating the gameplay state from the identified time. The state parameter data provides the necessary information for the gameplay application to determine the gameplay state from the identified time in the video, or a time or event closest to the identified time where state parameter data has been stored.

At block 814, the system can generate the determined game state. The game application can use additional state parameter information from the game application to generate the game state in conjunction with the state parameter data associated with the video. As the state parameter data includes a subset of the game state parameters, the game application provides the necessary state parameters to create an operational game state for the player. For example, the system can add in environmental objects, such as terrain, trees, and other elements.

At block 816, the system provides access to the user to the game state. The user can begin the playing the game at substantially the same state as in the gameplay video. To the extent that the user wishes to change the game state, the user can return to the gameplay video and select a different time to enter the game.

Gameplay Playback Process for an External Player

Figure 9:
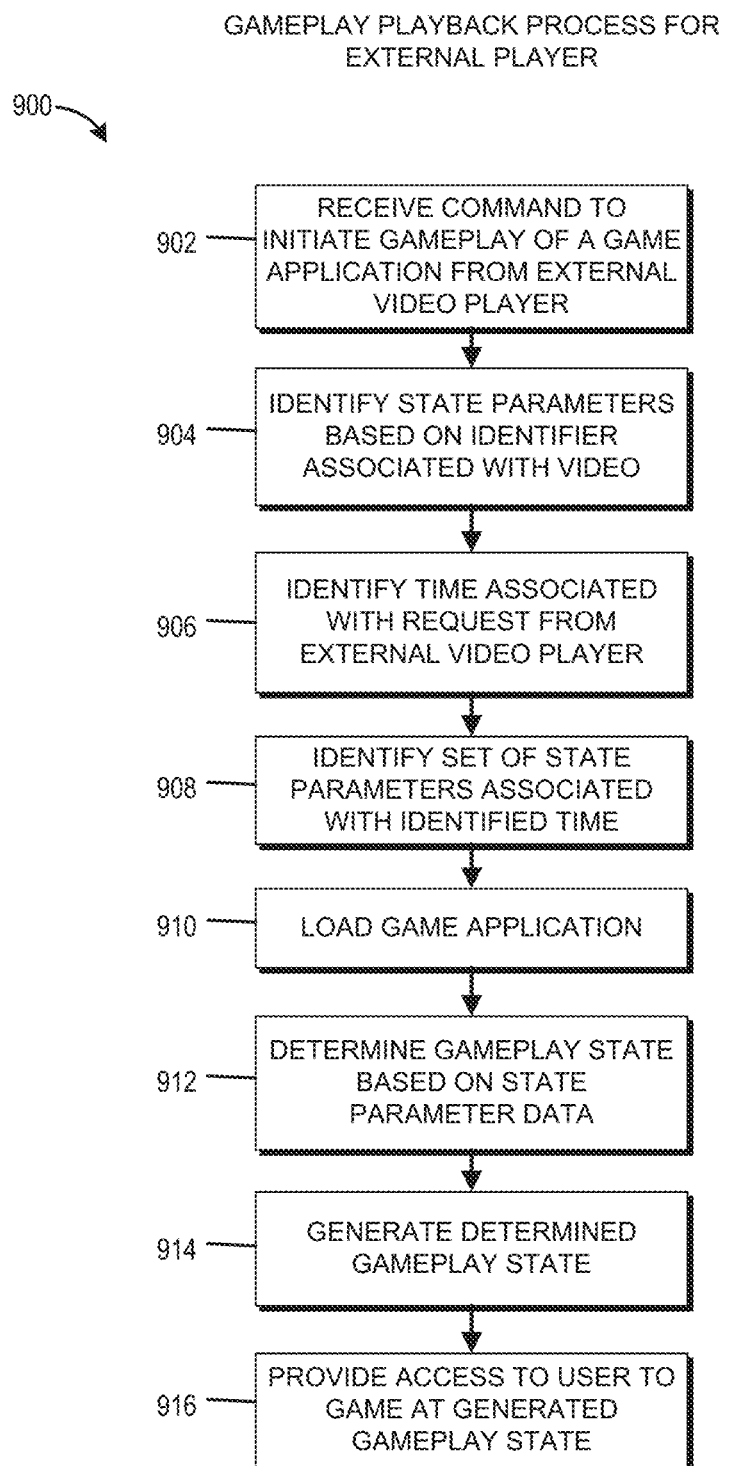
FIG. 9 illustrates an embodiment of a flowchart of an embodiment of a process for creating a gameplay state based on a subset of state parameters associated with an identified game state using an external video player.

FIG. 9 illustrates a flowchart of an embodiment of a process 900 for creating a gameplay state based on a subset of state parameters associated with an identified game state using an external video player. The process 900 can be implemented by any system that can generate gameplay within an application based on stored state parameters for the application. For example, the process 900, in whole or in part, can be implemented by a game application 420, or a playback module 424, among others. Although any number of systems, in whole or in part, can implement the process 900, to simplify discussion, the process 900 will be described with respect to these particular systems.

At block 902, the system receives a command to initiate gameplay of a game application from an external video player. The external video player can be a video that is viewed using a general purpose content sharing website (for example, YouTube). The user can view the video and activate a uniform resource locator (URL) within the video that makes a call to a specific game application.

At block 904, the system can identify state parameter data for the video based on an identifier associated with the command to initiate the game application. For example, the identifier could be stored in a URL associated with the video.

At block 906, the system can identify a time associated with a request from the external video player. At block 908, the system identifies state parameter data associated with the identified time. The state parameter data associated with the video can be the state parameter data that is closest to the identified time. The identified state parameter data can be before or after the identified time.

At block 910, the system can load into the game application system. After the game application is loaded, at block 912, the system can determine a gameplay state based on the state parameter data. The state parameter data includes a set of state parameters for generating the gameplay state from the identified time. The state parameter data provides the necessary information for the gameplay application to determine the gameplay state from the identified time in the video.

At block 914, the system can generate the determined game state. The game application can use additional state parameter information from the game application to generate the game state in conjunction with the state parameter data associated with the video. As the state parameter data includes a subset of the game state parameters, the game application provides the necessary state parameters to create an operational game state for the player. For example, the system can add in environmental objects, such as terrain, trees, and other elements.

At block 916, the system provides access to the user to the game state. The user can begin the playing the game at substantially the same state as in the gameplay video. To the extent that the user wishes to change the game state, the user can return to the gameplay video and select a different time to enter the game.

Multiplayer

In some embodiments, the gameplay videos can be recorded that include multiple player characters within a single game state. In such embodiments, the state parameter data can be subdivided into individual data streams for each player. In some embodiments, a video can be created for each character, whereas in other embodiments, a single video can include data streams for multiple characters without including separate audio/visual streams associated with gameplay of the other characters. In such embodiments, a player can invite friends to participate in a completing a group based gameplay event.

Live Video with Gameplay Content

In some embodiments live action sequences can be used as a template to create gameplay that matches the live videos, such as, for example, a live action sequence from a movie. The live action sequence can be recreated within the video game application and gameplay information can be added to the live action video. In this manner, a user watching a live action video or movie can select defined times within the video to enter a gameplay state within the video game application.

Cross-Platform Utilization

In some embodiments the videos can be shared across different gaming platforms. For example a video recorded in a game application operating in a first operating environment can be viewed and utilized by a user operating the game application in a second operating environment. For example, a user operating a PlayStation 4 can record a video with embedded gameplay parameters that can be accessed on an Xbox One.

Networked Computing Environment and Video Streaming Service

Figure 10:
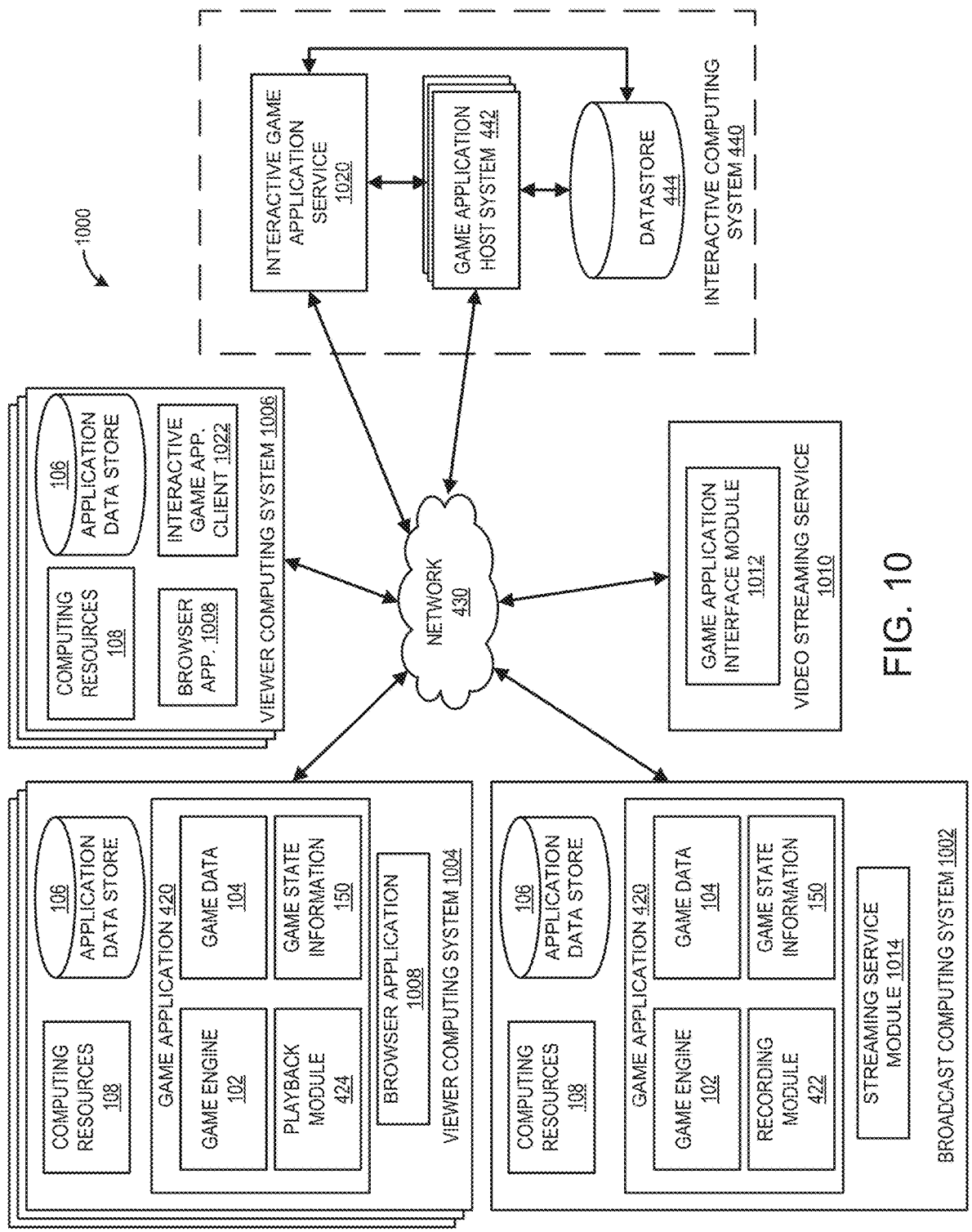
FIG. 10 illustrates an embodiment of a networked computing environment including a video streaming service.

FIG. 10 illustrates an embodiment of a networked computing environment 1000. The network computing environment 1000 can implement one or more embodiments of a gameplay playback system. The networked computing environment 1000 can include a broadcast computing system 1002, one or more viewer computing systems 1004, 1006 and one or more interactive computing systems 440. To simplify discussion, but not to limit the present disclosure, FIG. 10 illustrates one interactive computing system 440. The broadcast computing system 1002 and viewer computing systems 1004, 1006 may communicate via a network 430 with the interactive computing system 440 and video streaming service 1010. Although only one network 430 is illustrated, multiple networks 430 may exist.

Video Streaming Service

The video streaming service 1010 can stream content from users that broadcast content. The broadcast content can be provided by a broadcast computing system 1002. The broadcast computing system 1002 can be associated with a user that has a user account on the video streaming service 1010. The broadcasting user can provide broadcasts associated with video game applications, where the broadcast includes a live stream of the user playing a game application in real time. For example, the broadcasts may include playthroughs of video games, broadcasts of esports competitions, creative content, and other types of content.

The video streaming service 1010 can provide viewing users, also referred to as viewers, with various options for viewing content. Content from the video streaming service may be viewed live or on-demand. The content may be viewed in various levels of quality (such as for example, high definition or standard definition). A viewing user interfacing with the video streaming service 1010 using a viewer computing system 1004, 1006 may have access to a search function for accessing various types of streaming video content. For example, the user may be able to search for content by game title, featured games, by event, by broadcaster, by popularity, video game system, favorite channels, or other topics. The video streaming service may provide chat functionality that provides users with an interface to communicate with the broadcaster and other viewers. Chat functionality may include audio and text-based chat systems. In some embodiments, a stream may include an announcer that is different than the broadcaster providing audio commentary on gameplay of a game application. The steaming video service 1010 may also provide streaming capability for multiple streams of content integrated into a single viewable stream by the viewer. For example, a streaming channel may include a stream of the game application 420 (including audio and video data from the gameplay of the game application), also referred to as a gameplay stream, and a stream of the broadcaster (including audio and/or video data of the broadcaster), also referred to as a broadcaster stream.

Game Application Interface Module 1012

The game application interface module 1012 can be configured to interface with a streaming service module 1014 on a broadcast computing system 1002 in order to stream content directly to the video streaming service 1010. For example, the game application interface module 1012 can be configured to interface with game consoles (such as, for example Xbox® consoles), game hosting software applications (such as, for example, Electronic Art's Origin software), specific game applications, video card software applications, and other systems that provide can broadcast a gameplay stream to the video streaming service 1010. In some embodiments, the gameplay stream may include gameplay data, such as, gameplay state information, associated with the live gameplay session of the game application. The game application interface module 1012 may communicate with the interactive computing system 440. In some embodiments, the game application interface module may have a plugin type module configured to communicate gameplay information associated with the gameplay stream to the interactive computing system 440. For example, the video streaming service 1010 may provide the interactive game application service 1020 with gameplay information used to provide a viewer, such as a viewer computing system 1006, with access to a streamed game application.

Broadcast Computing System

The broadcast computing system 1002 may include hardware and software computing resources 108. The broadcast computing system 1002 may have varied local computing resources 108, networking equipment, one or more application data stores 106, and be configured to execute a game application 420. Execution of the game application 420, including the game engine 102, game data 104, game state information 150, and recording module 422 are described herein with reference to, at least, FIG. 4. In the illustrated embodiment, the broadcast computing system 1002 includes a recording module 422. In some embodiments, the game application 420 may additionally include a playback module 424, the operation of which is further described herein with reference to at least FIG. 4. The broadcast computing system 1002 also includes a steaming service module 1014. The broadcaster computing system 1002 may be any type of computing system, such as, a game console, a handheld gaming console, mobile computing device, a laptop or desktop computer, and the like. For example, the user computing system 410 may be implemented as one or more of the computing devices 14 illustrated in further detail in FIGS. 1, 2, and 4.

Streaming Service Module 1014

The streaming service module 1014 can be configured to interface with a game application interface module 1012 on the video streaming service 1010 in order to stream content directly to the video streaming service 1010. For example, the streaming service module 1014 may be integrated into hardware and/or software on the broadcast computing system 1002. For example, the streaming service module 1010 may be integrated into the hardware and/or firmware of components of the computing system (such as, for example, a game console), game hosting software applications (such as, for example, Electronic Art's Origin software), specific game applications, graphics card software applications, and other systems that provide functionality for interfacing with the video streaming service 1010 to broadcast a gameplay session of a video game application 420. The streaming service module can also be configured to interface the with the video streaming service 1010 in order to provide a gameplay stream (including audio and/or video streams of the game application) and/or the broadcaster stream (including audio and/or video streams of the broadcaster). In some embodiments, the gameplay stream may include gameplay data, such as, gameplay state information, associated with the live gameplay session of the game application.

Interactive Computing System

The interactive computing system 440 may include one or more computing systems associated with the game application 420. Further, the interactive computing system 440 may include one or more game application host systems 442 enabling multiple users to access a portion of the application 420. In some embodiments, the application host systems 442 can be configured to execute at least a portion of a game application 420 executing on a computing system (such as, broadcast computing system 1002). In some embodiments, a game application host system 442 can host and maintain a data store 444 configured to store information associated with the game application host systems 442 and the interactive computing system 440. The data store 444 can include gameplay videos associated with a plurality of game applications 420. In some embodiments, the interactive computing system 440 may include an interactive game application service 1020. The interactive computing system can interface with the broadcast computing system 1002, viewer computing systems 1004, 1006, and video streaming service 1010 to implement various aspects of the game application playback system.

Interactive Game Application Service

The interactive game application service 1020 can be configured to communicate with the interactive game application client 1022 in order to execute game applications 420 using computing resources local to game application steaming service 1020. The interactive game application service 1022 can be configured to communicate information to the interactive game application client 1020 for the operation and output of a game application 420 being executed by the game streaming service 1020. The client (such as viewer computing system 1006) of the interactive game application service 1020 can interactively play the game application on the client's computing system as if it were operating locally. The game streaming service 1022 can receive user input provided by the viewer computing system 1006 through game streaming client 1022 to control operation of the game application 420. For example, a game application loaded on the interactive game application service 1020 can be output on the viewer computing system and the game application can be controlled based on user inputs received from the viewer computing system 1006.

The interactive game application service can be implemented based on the embodiments of an interactive game application service disclosed in U.S. Patent Publication No. 2014/0274384, entitled "Delivering and Consuming Interactive Video Gaming Content," which is herein incorporated by reference in its entirety.

The game streaming service 1020 can operate independently of the game application host system 442 and data store 444. The game streaming service 1020 can execute the game application 420 as described with reference to the broadcast computing system 1002 and viewer computing system 1004. The execution of the game applications by a computing system is described in further detail herein with reference to at least FIGS. 1-4.

Viewer Computing System

The computing environment 1000 illustrates embodiments of viewer computing systems 1004 and 1006. The viewer computing systems 1004, 1006 include hardware and software resources 108. The viewer computing systems 1004, 1006 have varied local computing resources 108, networking equipment, and one or more application data stores 106. The viewer computing systems 1004, 1006 may include a browser application for navigating a network (such as the Internet) and interfacing with the video streaming service 1010 and/or the interactive computing system 440.

The viewer computing system 1004 can include software and/or hardware configured to execute a game application 420. Execution of the game application 420, including the game engine 102, game data 104, game state information 150, and recording module 422 are described herein with reference to at least FIG. 4. In the illustrated embodiment, the viewer computing system 1004 includes a playback module 424. In some embodiments, the viewer computing system 1004 may additionally include a recording module 422, the operation of which is further described herein with reference to at least FIG. 4. The viewer computing system 1002 also includes a browser application 1004. The viewer computing system 1004 may include any type of computing system, such as, a game console, a handheld gaming console, mobile computing device, a laptop or desktop computer, and the like. For example, the viewer computing system 1004 may be implemented as one or more of the computing devices 14 illustrated in further detail in FIGS. 1, 2, and 4.

The viewer computing system 1006 includes a browser application 1008 and an interactive game application client 1022. The viewer computing system 1004 may include any type of computing system, such as, a game console, a handheld gaming console, mobile computing device, a laptop or desktop computer, and the like. However, the viewer computing system 1006 may not be configured to execute a game application 420 to execute locally on the system. For example, the viewer computing system 1006 may not have hardware and/or software computing resources that are capable of executing the game application.

Interactive Game Application Client

The interactive game application client can be configured to communicate with the interactive game application service 1020 in order to stream one or more game applications 420, whereby the game application 420 is executed using the computing resources of the interactive game application service 1020. The interactive game application client 1022 can be configured to communicate with the interactive game application service 1020 in order to output the execution of the game application on the viewer computing system 1006. The client 1022 can provide an interface for input provided by the user to be communicated to the game streaming service 1020 to control operation of a streaming game 420 as if were being executed locally on the viewer computing system 1006. The interactive game application client 1022 can provide an interface to a user to select game application(s) 420 that are available through the game streaming service 1020.

Embodiment of a Video Streaming Service User Interface

Figure 11:
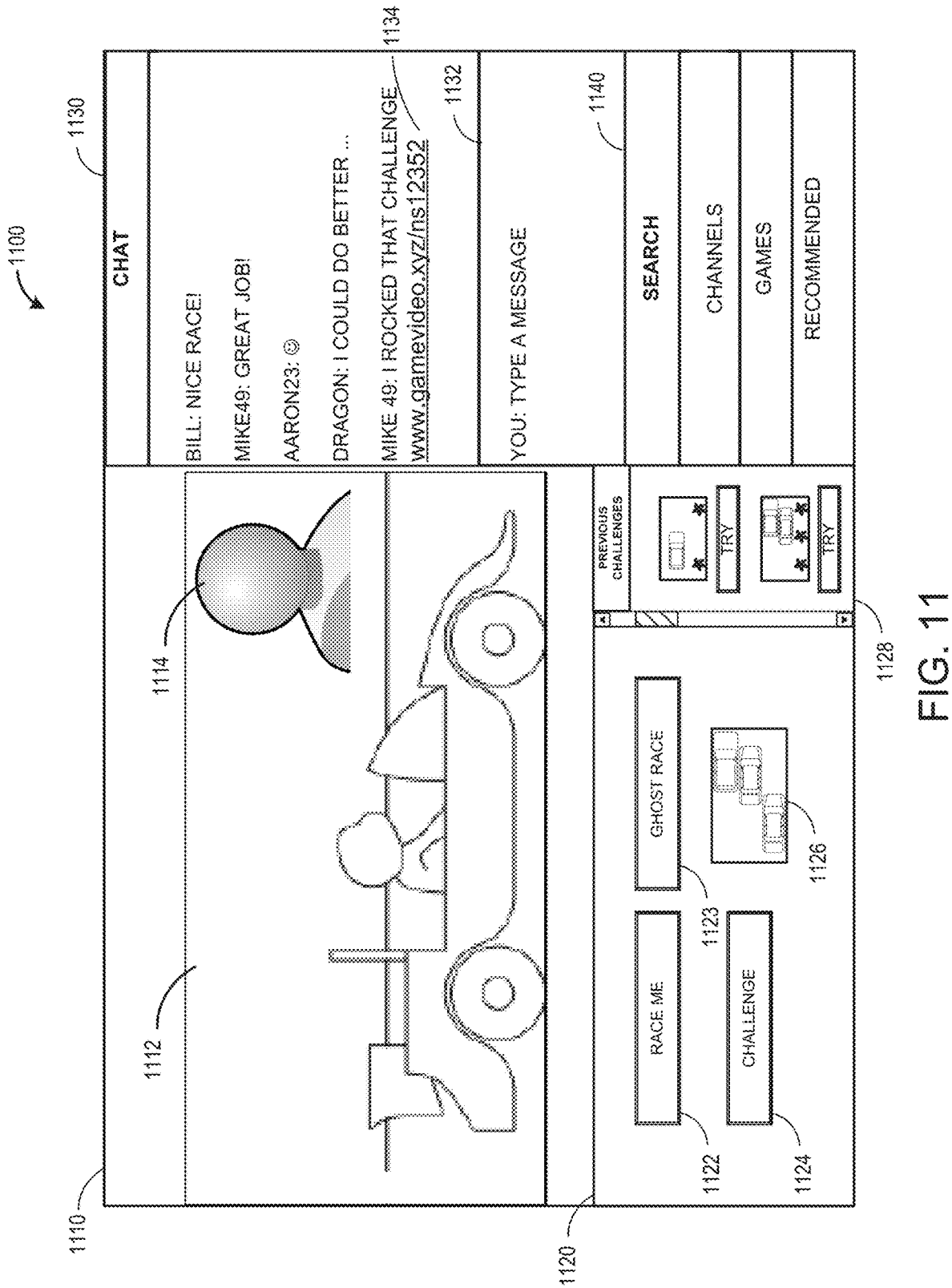
FIG. 11 illustrates an embodiment of a user interface of a video streaming service.

FIG. 11 illustrates an embodiment of a user interface 1100 for a viewer interfacing with the video streaming service 1010. The user interface 1100 can be accessible through the video streaming service 1010. For example, the user interface 1100 can be accessible by a viewer computing system 1004, 1006 accessing the video streaming service 1010 using a browser application 1008. The broadcast computing system 1002 can provide the gameplay stream and a broadcast stream associated with a specific page or channel of the video streaming service 1010. For example, each channel can be associated with a different broadcasting user.

This embodiment of the user interface 1100 includes a stream portion 1110, a gameplay interaction portion 1120, a chat portion 1130, and a search portion 1140. The stream portion provides a gameplay stream 1112 and/or a broadcast stream 1114. The gameplay stream 1112 can provide a stream of the gameplay of the execution of a game application 420 on the broadcast computing system 1002. The gameplay stream can 1112 can be shown during runtime of the game application 420 on the broadcast computing system 1002. The gameplay stream 1112 and/or the broadcast stream 114 can be displayed in substantially real-time with the operation of the game application 420 on the broadcast computing system 1002.

In some embodiments, gameplay stream 1112 can be viewed using virtual reality (VR) hardware. The VR hardware can be used by a user to view the gameplay stream from within the game application. In such instances, the viewer computing system may be required to have the game application loaded on the computing system. For example, the viewer may be able to view the game application from the perspective of the player character. The viewer may have 360 degrees of freedom view the game environment. In some embodiments, the stream may provide a VR experience where the viewer can watch a game stream without having the game application loaded and/or an offline game stream.

The gameplay interaction portion 1120 may include various options for the user to interact with a game application 420 that a broadcaster is playing. In the illustrated embodiment, the broadcaster provides a game instance invite control ("RACE ME"), a real-time gameplay control 1123 ("GHOST RACE"), and a gameplay event control 1124 ("CHALLENGE"). In some embodiments, the controls 1122 and 1124 may be displayed based on an account status of a viewer. In an illustrative example, a guest user may not have access to any controls, a registered member of the video streaming service 1010 may have access to the event control 1124, and a paid subscriber of the broadcaster channel may have access to the invite control 1122, the real-time control 1123, and the event control 1124.

The controls 1122, 1123, or 1124 can include embedded instructions to load the game application associated with the video stream. In instances when the video game application is stored locally on a viewer computing system, such as viewer computing system 1004, the video game application can be executed and loaded. In instances when the video game application is not stored locally on the viewer computing system, such viewer computing system 1006, the instructions may request input from the user regarding how the user would like to access the video game. For example, the interface may provide an option to access the game through the interactive game application service 1020. In which case, the prompt may execute or provide access to a download of the interactive game application client 1022. In some embodiments, the interface may provide access to the user to download the game locally on the viewer computing system. For example, the download may be demonstration, time-limited, or other limited version of the game application that can be downloaded by the user. The game application may be a full download that may be downloaded in the background while the user watches the video stream. The game application may be downloaded using peer-to-peer data transfer technologies from other users playing the game application.

The invite control 1122 can be configured to provide access to the user to join a gameplay instance of the broadcaster. The invite control can be configured so that the viewer interacting with the invite control can join the game instance of the broadcaster. For example, the broadcaster may be playing a multiplayer racing game with one or more available spots and a viewer may attempt to join the instance of the game by selecting the invite control 1122. The invite control 1122 can be configured to provide instructions to the viewer computing system 1004 to launch an instance of the game application and join the game instance of the broadcaster. The invite control 1122 may identify a game identifier associated with the game instance of the broadcaster. The game identifier can be used by a game application 420 and the interactive computing system 440 to access the game instance of the broadcaster.

The gameplay event control 1124 can be configured so that the viewer interacting with the control can access a gameplay event generated by the broadcaster. The gameplay event generated by the broadcaster can be generated during the gameplay stream. The broadcaster may generate the event any point during gameplay. For example, the broadcaster may generate an event associated with a specific level, achievement, stunt, encounter, or any other gameplay event. In some embodiments, the game application can continuously record state information for a defined period of time, also referred to as the capture time period. The capture time period may be any defined length of time, such as, for example, two minutes, one minute, 30 seconds, 15 seconds, or any other time period. The state information may be stored at defined intervals (such as, for example, every second) using a circular or ring buffer for the entire capture time period. The circular buffer writes continuously writes over the old data throughout the play session. In this manner, the broadcaster can generate a playback event based on game events that occurred within the capture time period. The playback event could be generated at a predetermined amount of time prior to receiving the input from the broadcaster to generate the event. In some embodiments, the generated playback event may only include state information for only a single point in time. For example, the game event could be generated for the point in time 15 seconds before the input was received. In some embodiments, the recording module 422 may generate a video associated with the playback event that includes state information for the entire capture time period. The playback event videos can similar to the gameplay videos described with reference to FIGS. 6A and 6B, in which a viewer can identify a specific point within the video event to enter the game application. The state information associated with the event output 1126 can be stored in the data store 444 and accessed when a user selects event output 1126. In some embodiments, the recording module 422 can generate a shareable media output corresponding to the playback event. The media output 1126 may include a uniform resource identifier ("URI"), an image, a graphics interchange format (GIF), a video or other format that can be viewed and shared by a user. The media output 1126 associated with the event may be displayed in the user interface 1100.

When the playback event is selected by a user, the values of a defined set of state parameters associated with the playback event can be used by the game application to recreate the game state of the playback event. The game application can load and use the stored values to create the game state for the playback event. The defined state parameters may only represent a portion of the total state parameters that are used to recreate the game state. The portion of the total gameplay parameters that are recorded are specifically defined such that the game state can be created within the defined parameters. The game application can provide the additional information necessary to recreate the game state without all of the game state parameters. In some embodiments, there can be some variance between the actual gameplay and the recreated gameplay. In some embodiments, all of the gameplay parameters can be recorded and can be used to create as near as possible an identical recreation of the gameplay state of the game.

The real-time control 1123 can be is configured so that the viewer interacting with the real-time control 1122 can join a game instance that operates concurrently with the game instance of the broadcaster. The concurrent game instance is described in further detail herein with reference to FIGS. 12A and 12B.

The chat portion 1130 can provide an interface for the viewers to communicate with the broadcaster. The chat portion can include the messages input by other viewers. The chat portion may include an input portion 1132 that provides the user to communicate with the broadcaster. As illustrated, the chat portion may be used to provide a link 1134, such as a URI. The URI may be a link to a video of a playback event completed by one of the viewers in response to a playback event posted by the broadcaster. In some embodiments, the interface 1100 may include audio functionality for the viewers to speak with the broadcaster.

The search portion 1140 can include categories for accessing different channels based on specific criteria search criteria. In some embodiments, the channels can include tags or other identifiers that can be used to identify the channels and facilitate searching for specific types of channels. Searching can be performed based on ratings, viewing, recommendations, subject matter, or other criteria. Users can also search based on game specific criteria, such as by game names, game level, and so forth. The video streaming service 1010 can also organize and curate content. The system can filter the content to add or remove certain types of content or specific broadcasters from the search results. For example, a promoted broadcaster or game application may be weighted to show up more often in the search results.

Embodiments of Concurrent Game Instances

Figure 12A:
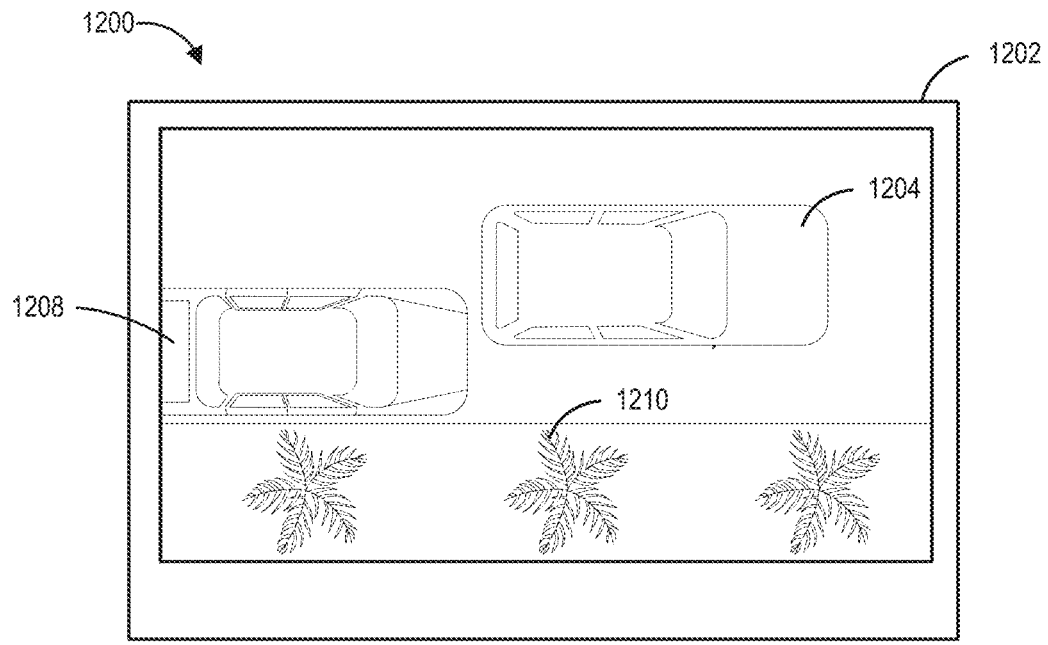
FIGS. 12A and 12B illustrate embodiments of a gameplay interface for an instance of a game application.
Figure 12B:
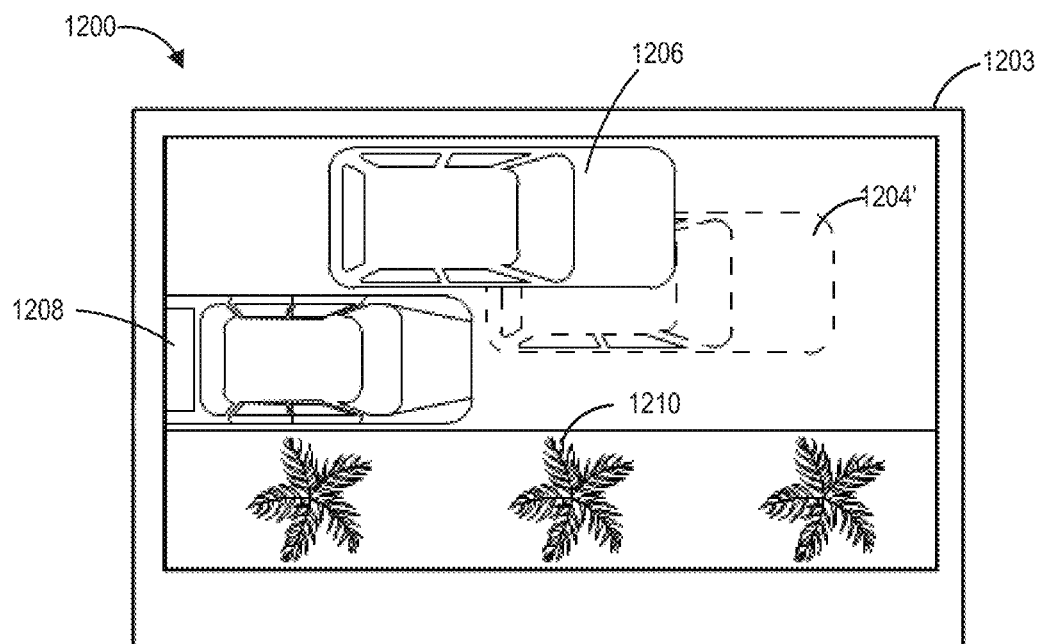

FIGS. 12A and 12B illustrate embodiments of a gameplay interface 1200 for an instance of a game application. FIG. 12A illustrates a first instance, also referred to as a primary instance, of a game application executing on a first computing system (such as, broadcast computing system 1002). FIG. 12B illustrates a second instance of the game application, also referred to as a secondary instance, executing on a second computing system (such as, viewer computing system 1004 or interactive game application service 1020), which executes concurrently with the first instance of the game application. The user interface 1200 illustrates the current game state in each instance. The illustrated user interface 1200 is a non-limiting example of a user interface 1200 for a game application.

FIG. 12A illustrates the first instance 1202 of the game application including a first player vehicle 1204, a non-player vehicle 1208, and inanimate objects within the game, such as the tree 1210. The first instance is being executed on a first computing system, such as the broadcast computing system 1002. The first player vehicle 1204 represents the entity that the broadcaster is controlling within the game application.

FIG. 12A illustrates the second instance 1203 of the game application including a second player vehicle 1206, a first player vehicle ghost 1204', a non-player vehicle 1208, and inanimate objects within the game, such as the tree 1210. The second instance 1203 is being executed on a second computing system, such as the viewer computing system 1004 or interactive game application service 1020. The second player vehicle 1206 represents the entity that the viewer is controlling within the game application. The first player vehicle 1204' is represented in dashed line to signify that the first player vehicle is not directly participating within the second instance of the game application. The position and actions of the first player vehicle ghost 1204' within the second instance 1203 is based on the position and actions of the first player vehicle 1204 within the first instance 1202 of the game application. The execution of the second instance 1203 parallels the execution of the first instance 1202. State information shared between the first instance 1202 and the second instance 1203 can be used to determine aspects of the first instance 1202 for display within the second instance 1203. The shared state information can be limited to a defined set of state information. For example, the shared information may be limited to the location and actions of only the first player character 1204, but not other entities, such as the non-player character 1208. Other entities and events within the second instance 1203 of the game application may be controlled by the game engine in accordance with the normal operating parameters. In some embodiments, the information associated with the second instance 1203 is shared with the first instance 1202 as well. For example, a second player vehicle ghost may be displayed within the first instance.

In some embodiments, the second instance 1203 may be generated after the first instance 1202 based on a game identifier. The game identifier can be associated with the first game instance, which can be, at least partially, operating on the interactive computing system 440. The game identifier can be used by the second computing system to generate the second instance 1203 that parallels the first instance 1202 and is, at least initially, synchronized with the first instance 1202. For example, the second instance 1203 may be generated after the first computing system initiates a race. The second computing system can determine the game identifier associated with the first instance 1202 and generate the second instance 1203 by retrieving state information from the interactive computing system 440. In some embodiments, the second computing system may communicate directly with the first computing device to generate the second instance 1203. The second player can take over control of the player character entity in the second instance 1203 and a first player ghost character can be placed within the game that represents the substantially real-time position of the first player character within the second instance. In some instances, multiple ghost players can be present within a game instance. For example, the game application may support a defined number of game applications operating concurrent game instances. In some embodiments, no ghosts may be present.

Social Network

Figure 13:
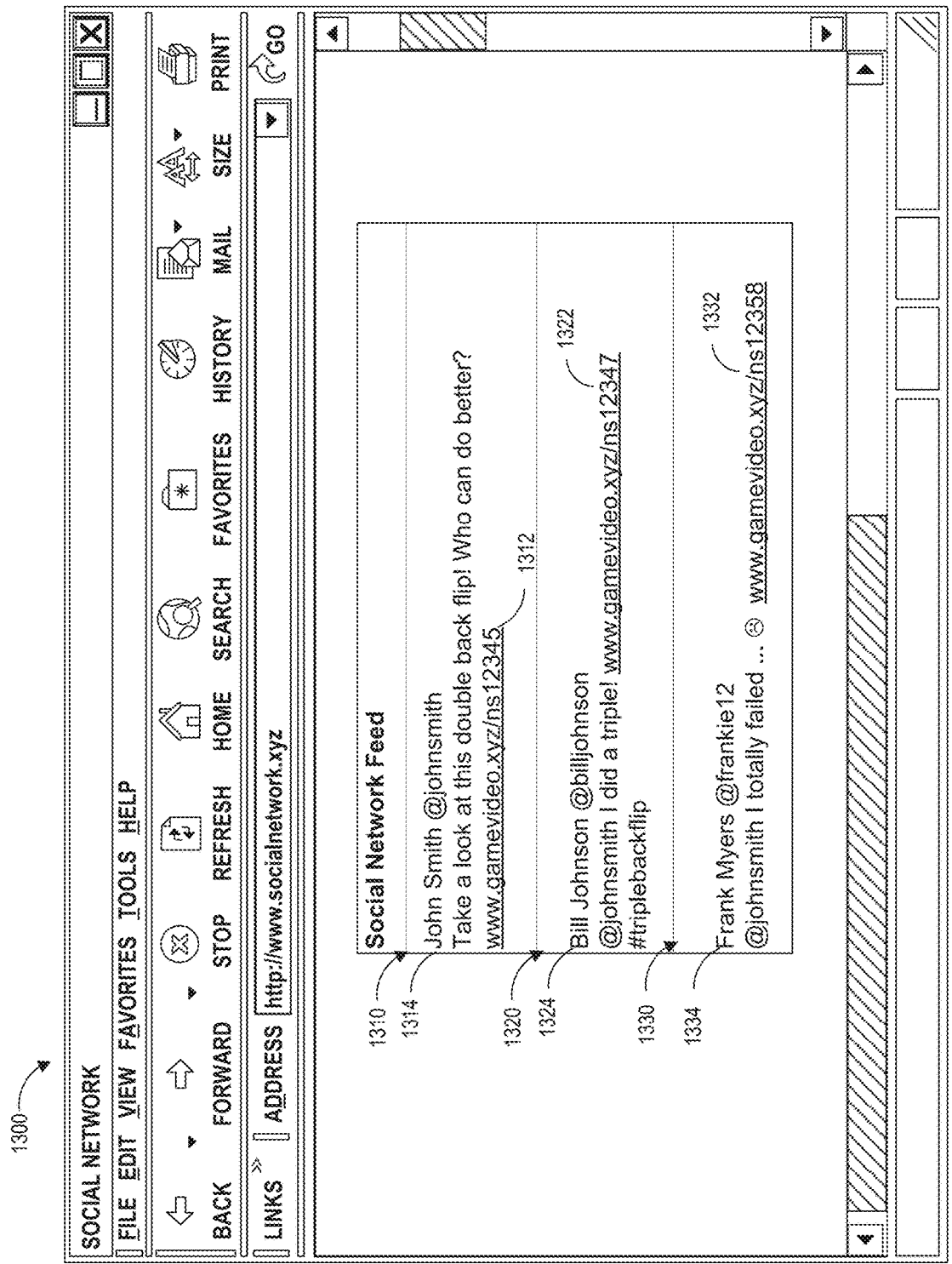
FIG. 13 illustrates an illustrative embodiment user interface of a social networking service.

FIG. 13 illustrates an illustrative embodiment of a user interface 1300 generated at least in part by a social networking service. In the user interface 1300, a first microblog message 1310 is illustrated. The first microblog message 1310 contains a link associated with a playback event that is included within the microblog message. The first microblog message 1310 also includes a first user identifier 1314. The playback event link can be provided in any data format, for example, the information could be a URI, text-based, images, video, audio or other types of information that is supported by the social networking service and can provided an embedded link to the playback event.

When the playback event link is selected by a user, the link can include embedded instructions for the user's computing system load a gameplay application and initiate the playback event associated with the playback event link. The playback event link can reference a datastore that includes values of a defined set of state parameters associated with the playback event, which can be used by the game application to recreate the game state of the playback event. The game application can load and use the stored values to create the game state for the playback event. The defined state parameters may only represent a portion of the total state parameters that are used to recreate the game state. The portion of the total gameplay parameters that are recorded are specifically defined such that the game state can be created within the defined parameters. The game application can provide the additional information necessary to recreate the game state without all of the game state parameters. In some embodiments, there can be some variance between the actual gameplay and the recreated gameplay. In some embodiments, all of the gameplay parameters can be recorded and can be used to create as near as possible an identical recreation of the gameplay state of the game.

In some embodiments, the data stored with a playback event can include playback session data, which may also be referred to as ghost player data, associated with the original user that provided the initial link to the playback event. When a subsequent user activates the link, the user may be able to see the player entity associated with the original user within the playback event. For example, if the playback event was linked to a jump, the subsequent user may see the trick the original player entity performed within the game environment (such as, for example, an actual version or a ghost version of the original player entity within the game environment) when the game application loads the playback event. Additionally, a user may be able to add playback event information associated with subsequent playbacks of the event. For example, a user can add the playback event data associated with their version of the playback event. In such an embodiment, a user may have the ability to perform editing functions associated with the event, such as start, stop, and replay. In some instances, the subsequent user may perform the event from a different position than the original user. For example, the subsequent user could perform a different jump in tandem with the original user. The subsequent user's playback session data can be added to the playback event. For example, a user that activates a playback event may see player data associated with the original player and three other players.

For example, in the illustrated embodiment, the user interface 1300 also includes a second microblog message 1320, also referred to as a reply microblog message. The reply microblog message 1320 has user identifier information 1324 associated with a second user account. The reply microblog message 1320 includes a link 1322 to another version of the same playback event executed by the second user. The link 1322 can be a playback event link that includes playback session data associated with the first user 1314 and with the second user 1324. The user interface 1300 also includes a third microblog message 1330. The third microblog message 1320 includes a link 1332, and user identifier information 1334 associated with a third user account. The link 1330 can be a playback event link that includes playback session data associated with the initial user 1314 and with the second user 1324 and the third user 1334. In some embodiments, the playback event links can all use the same URI to reference the same data storage location associated with the event. The event data can then be updated anytime someone activates the playback event link. In some embodiments, different instances of the playback event link can be stored so that specific playback session data is associated with each event link.

The user interface 1300 generally illustrates a sample embodiment of a user interface that is generated by the social networking service that can be used to share playback events between users. It will be appreciated that a number of variations are possible in such a user interface depending on the given social networking service, the functionality desired and/or other factors.

In some embodiments, the playback events may be associated with additional social networking features. The playback events including the related events associated with subsequent users may have leaderboards, ratings, or other features that may be used to assess the popularity of a specific playback event. In some embodiments, the playback events may be shared via social media services or chatrooms using searchable tags (such as hashtags). The playback events may be shared in the comments of other social media or media streaming network based services. For example, a user may respond with a playback event in response to a YouTube video of a playback event.

Continuous Gameplay Capture Process

Figure 14:
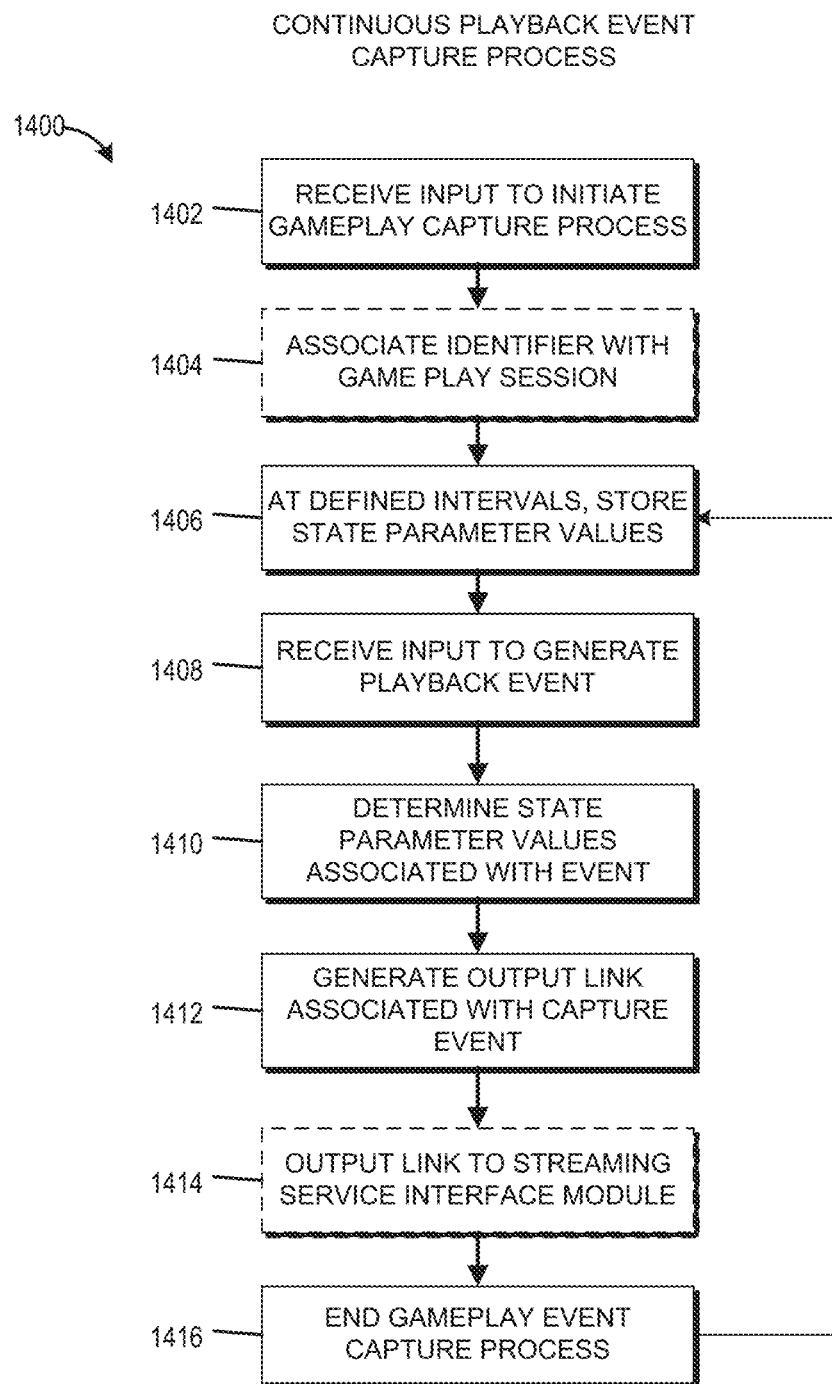
FIG. 14 illustrates a flowchart of an embodiment of a process for continuously recording a gameplay video with embedded state parameters.

FIG. 14 illustrates a flowchart of an embodiment of a process 1400 for continuous recording of gameplay video including game state parameters. The process 1400 can be implemented by any system that can record gameplay within an application. For example, the process 1400, in whole or in part, can be implemented by a game application 420, or a recording module 422, and the game engine 102, among others. Although any number of systems, in whole or in part, can implement the process 1400, to simplify discussion, the process 1400 will be described with respect to these particular systems.

At block 1402, the system can receive input to initiate a gameplay capture process for capturing playback events. The gameplay capture process can be started by a user providing a command to initiate the capture process. In some embodiments, the input to initiate the capture process can be generated by the system based on triggers generated with the game. In some embodiments, the gameplay capture process can begin recording as soon as the user begins playing the game application. The triggers can be based on events or actions performed within the game application, such as performing a specific achievement or completing a specific segment of the game.

At block 1404, in some embodiments, an identifier can be associated with the gameplay session. The identifier can be a unique identifier that can be used to identify the gameplay and the stored state data. The identifier can be used to associate the video with the state data when the video file and state data are stored in separate locations.

At block 1406, the state parameters values are stored at defined intervals. The game application can continuously record state information for a capture time period. The capture time period may be any defined length of time, such as, for example, two minutes, one minute, 30 seconds, 15 seconds, or any other time period. The state information may be stored at defined intervals (such as, for example, every second) using a circular or ring buffer for the entire capture time period. The circular buffer writes continuously writes over the old data throughout the play session. In this manner, the broadcaster can generate a playback event based on game events that occurred within the capture time period.

The stored state parameters can be a subset of the total number of state parameters of the game state. The subset can be defined based on the individual game application. Each game application can utilize different state parameters for creating a game state. The set of state parameters can include one or more parameters including positional parameters (such as, for example, momentum, character position, proximity to other characters, and the like), game environment parameters (such as, for example, the state of components within the game environment, game level, camera position, position of items, and the like), player character parameters (such as, for example, player items, player character level, player character attributes and skills, and the like), non-player character parameters (such as, for example, non-player character position, proximity to the player, activity within the game state), and other types of state parameters for generating a game state. The state parameter values can be stored in a data stream associated with the video. In some embodiments, the state parameter values are stored separately from the video stream, but can be later linked to or associated with the corresponding video frames.

The intervals can be time-based or event-based. At each time-based or event-based interval the values associated with the state parameters are stored. As mentioned previously, the values can be stored in a data stream with the video or in a separate location. The time-based intervals can be periodic, such as every second, every two seconds, 500 milliseconds, or other time period. In some embodiments, the time interval may vary, for example, the certain types of gameplay may increase or decrease the frequency of the time-based interval, such as sequences of quick action or events. The event-based interval can be at irregular time intervals. For example, the event-based interval can be triggered based on triggering events or changes to values of specific state parameters. For example, in a turn-based game, the event-based interval may only occur at the end of each turn. The game application can define when the event-based intervals trigger the storage of the values of the state parameters. The system continues to store the state parameter values at the defined time intervals.

At block 1408, the system receives input to generate a playback event. Based on how the input is generated, the system may generate state information associated with the event at a defined time, or a plurality of sets of state information may be generated for the playback event. The playback event could be generated at a predetermined amount of time prior to receiving the input from the broadcaster to generate the event. In some embodiments, the generated playback event may only include state information for only a single point in time. For example, the game event could be generated for the point in time 15 seconds before the input was received. In some embodiments, the recording module may generate a video associated with the playback event that includes state information for the entire capture time period. Upon receiving the input to generate the playback event, the system determines state parameter values associated with the playback event at block 1410. The state information can be stored in an appropriate data store, such as data store 44, for the playback event.

At block 1412, the system generates a playback event link associated with the playback event. For example the playback event link can be an embeddable resource such as a URI. In some embodiments, the system can generate an embeddable media file associated with the playback event. For example, the system can generate an image, a GIF, or video file associated with the playback event. The system can process and save the event data with the embedded state parameters. In some embodiments, the video can be uploaded to a network based storage location, such as the video data store 444. In some embodiments, the videos can be stored locally and uploaded to a video data store 444.

At block 1414, the system, optionally, outputs the capture event link to a video streaming service. The capture event link may be automatically output to the video streaming service. For example, as illustrated in FIG. 11.

At block 1416, the playback event process ends. The system returns to block 1406 to continue to record state data associated with the gameplay session.

Concurrent Game Application Instance Generation Process

Figure 15:
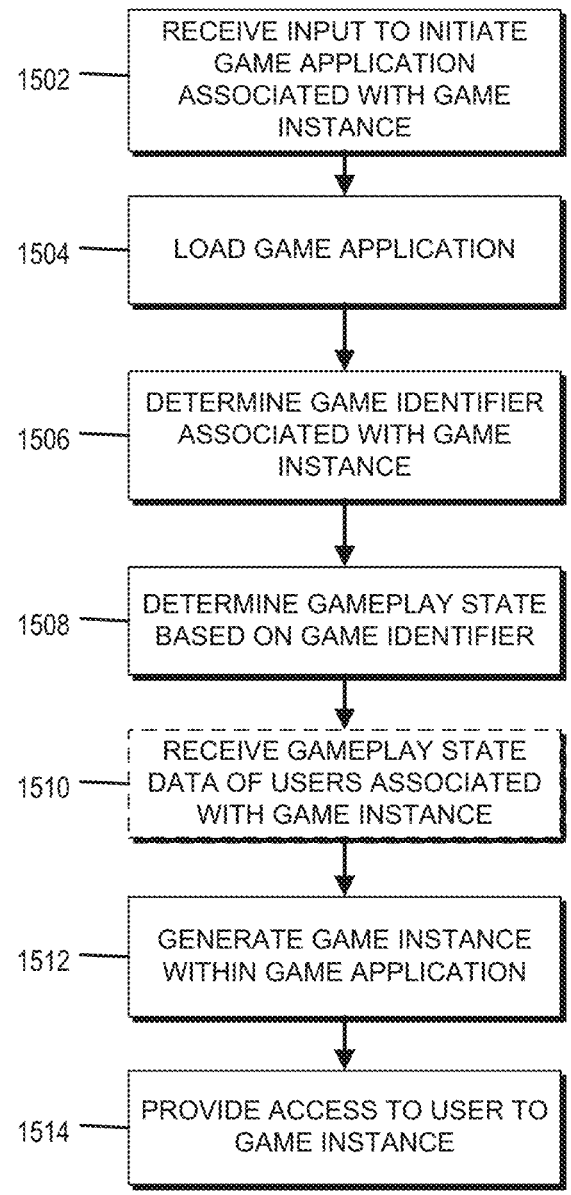
FIG. 15 illustrates a flowchart of an embodiment of a process 1500 for generating concurrent game instances on separate computing systems.

FIG. 15 illustrates a flowchart of an embodiment of a process 1500 for generating concurrent game instances on separate computing systems. The process 1500 can be implemented by any system that can generate gameplay within an application based on state parameters associated with an application. For example, the process 1500, in whole or in part, can be implemented by a game application 420, a playback module 424, and/or a game engine 102, among others. Although any number of systems, in whole or in part, can implement the process 1500, to simplify discussion, the process 1500 will be described with respect to these particular systems.

At block 1502, a second computing system can receive user input to initiate a game application associated with a first game instance operating concurrently on a first computing system. The input can come from a user interacting with a user interface such as the real-time user interface control 1123 illustrated in FIG. 11.

At block 1504, the second computing system can load the game application. After the game application is loaded, at block 1506, the system can determine a game identifier associated with first game instance. In some embodiments, the game identifier may be embedded in to the real-time user interface control.

At block 1508, the second computing system determines a gameplay state based, at least in part, on the game identifier. The game identifier can be used to identify state parameter data associated with the first game instance. The state parameter data can includes a set of state parameters for generating the gameplay state of the first gameplay instance. The state parameter data provides the necessary information for the gameplay application to determine the gameplay state. In some embodiments, the game application can communicate with an interactive computing system to identify the state parameters associated with the first game instance.

At block 1510, the second computing system can, optionally, receive state parameter data from other instances of the game application operating concurrently with the first game instance. For example, in some game applications, the game application may generate "ghosts" associated with one or more gameplay instances operating concurrently with a primary instance. For example, a racing game may support concurrent operation if eight instances, the state information of each game can be provided to the requesting second computing system.

At block 1512, the second computing system can generate the determined game state for the second instance. The game application can use additional state parameter information from the game application to generate the game state in conjunction with the state parameter data associated with the video. As the state parameter data includes a subset of the game state parameters, the game application provides the necessary state parameters to create an operational game state for the player. For example, the system can add in environmental objects, such as terrain, trees, and other elements. In some embodiments, the second computing system may make a parallel copy of the first game instance so that substantially all of the state parameters are the same.

At block 1514, the system provides access to the user to the game state. The user can play the second game at substantially the same state as in the gameplay video. The second instance parallels the first game instance and operates in real-time with the first game instance. For example, in a racing game, the user of the second computing system can race the user of the first computing system even though they are operating in different instances of the game application.

Real-Time Game Streaming of Game Applications

Figure 16:
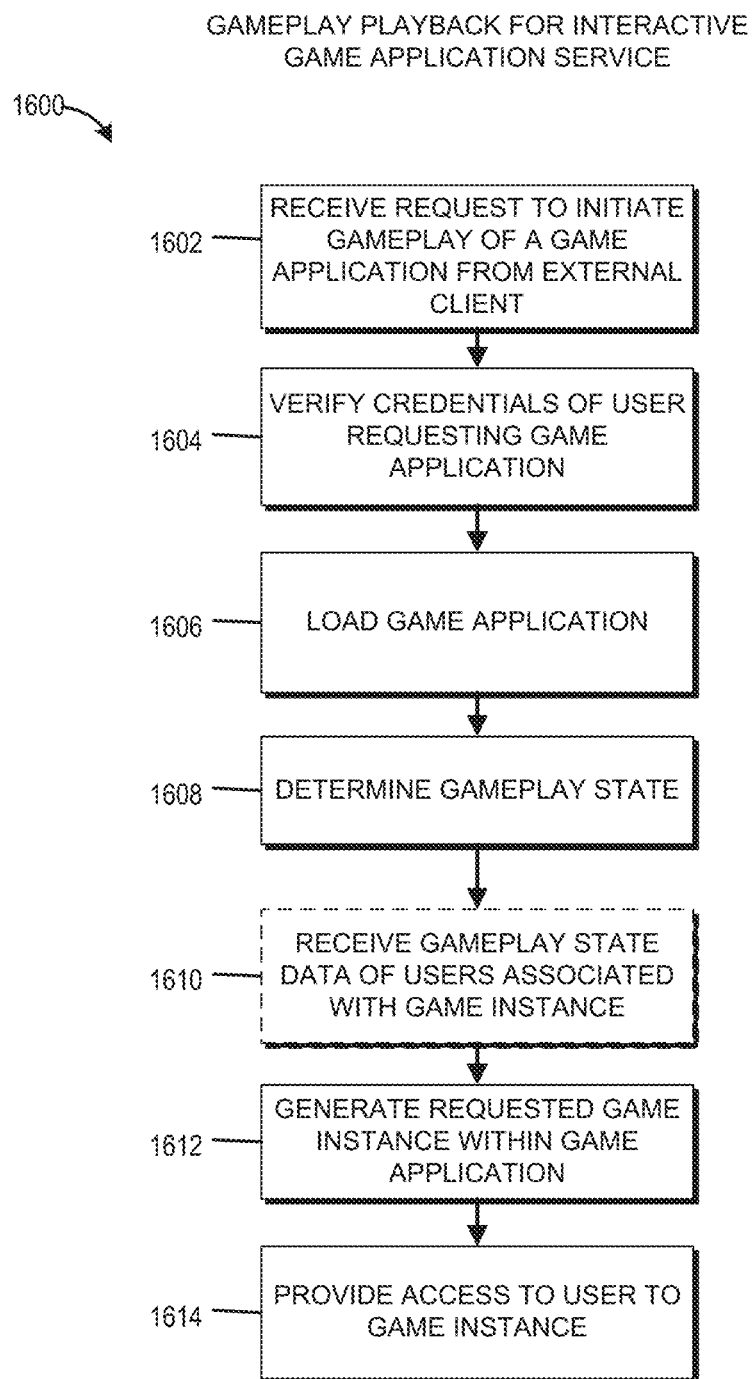
FIG. 16 illustrates a flowchart of an embodiment of a process 1600 for real-time interactive game streaming of game applications using an interactive game application service.

FIG. 16 illustrates a flowchart of an embodiment of a process 1600 for real-time interactive game streaming of game applications using an interactive game application service. The process 1600 can be implemented by any system that can provide a network-based interactive game application to a client computing system. For example, the process 1600, in whole or in part, can be implemented by an interactive game application service 1020, and an interactive game application client 1022, among others. Although any number of systems, in whole or in part, can implement the process 1600, to simplify discussion, the process 1600 will be described with respect to these particular systems.

At block 1602, the system receives a command to initiate gameplay of a game application from an external application on a client computing system, such as viewer computing system 1006. The command may be sent by a control received from a website associated with a video streaming service 1010. For example, a user of the viewer computing system 1006 may request to play a game application that is streaming on the video streaming service. In some embodiments, the request to play the game may be routed through an interactive game application client 1022, which can communicate with the interactive game application service 1020. In some embodiments, the request may be received from an external video player on a general purpose content sharing website (for example, YouTube). The user can view the video and activate a uniform resource locator (URL) within the video that makes a call to a specific game application.

At block 1604, the interactive game application service can verify account credentials of a user requesting use of the interactive game application service. For example, the user may be required to have a specific account status to use the interactive game application service. In some embodiments, some game applications may require a free account or may have a limited trial time that may be used by the account holder to access the game. For example, the user can play for a defined amount of time before the interactive game application service denies the user further access. In some embodiments, the interactive game application service may verify that the requesting user has access to all of the content from the requested instance of the game application. For example, the requested instance of the game application may include downloadable content (DLC) that is not included with the game application that the user can access. In such an instance, the service may provide the DLC for purchase prior to authorizing access to the game application. In some instances, the interactive game application service may provide a time-limited usage of the DLC for playing the requested instance.

After the system verifies that the user can access the requested game, at block 1606, the system can load the game application. The interactive game application service can load the requested game application and establish communication with an interactive game application client 1022 on the requesting computing device.

At block 1608, the interactive game application service can determine game state information associated with the game application. For example, game state information may be associated with a playback event, a concurrent game instance, or an invite to an existing game instance. For a playback event the system can load state parameter data associated with the event from the appropriate data repository. The state parameter data includes a set of state parameters for generating the gameplay state for the identified event. The state parameter data can provide the necessary information for the gameplay application to determine the gameplay state from the requested event.

For a gameplay state that corresponds to a concurrent game instance the interactive game application service can determine a gameplay state based, at least in part, on the game identifier. The game identifier can be used to identify state parameter data associated with the first game instance. The state parameter data can includes a set of state parameters for generating the gameplay state of the first gameplay instance. The state parameter data provides the necessary information for the gameplay application to determine the gameplay state. In some embodiments, the game application can communicate with an interactive computing system to identify the state parameters associated with the first game instance. another primary instance of the game application that is running concurrently, the gameplay state information can be based on the existing instance of the game application. The gameplay state information can be used to synchronize the game play state of the secondary instance with the primary instance.

For an invite to an existing game instance, the interactive game application service can determine a game identifier associated with the existing game instance. The interactive game application service can communicate with entity hosting the identified game instance and communicate with the hosting computing system to enter the requested game instance.

At block 1612, the interactive game application service can, optionally, receive state parameter data from other instances of the game application operating concurrently with the first game instance. For example, in some game applications, the game application may generate "ghosts" associated with one or more gameplay instances operating concurrently with a primary instance. For example, a racing game may support concurrent operation of eight instances, the state information of each game can be provided to the requesting second computing system.

At block 1614, the interactive game application service can generate the determined game state for the second instance. The game application can use additional state parameter information from the game application to generate the game state in conjunction with the state parameter data associated with the video. As the state parameter data includes a subset of the game state parameters, the game application provides the necessary state parameters to create an operational game state for the player. For example, the system can add in environmental objects, such as terrain, trees, and other elements. In some embodiments, the second computing system may make a parallel copy of the first game instance so that substantially all of the state parameters are the same.

At block 1616, the system provides access to the user to the game state through the interactive game application client. The user can begin playing the game at substantially the same state as the gameplay event, concurrently with the primary instance, or within a specific game instance associated with the game invite.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
by one or more computing systems comprising computer hardware configured with specific computer-executable instructions,
receiving a request to generate a first playback event during a first gameplay session of a game application on a first computing system;
storing game state information associated with the first playback event, wherein the game state information includes at least one game state of a virtual environment of the game application;
generating a first playback event link, the first playback event link configured to provide access to the game state information of the first playback event;
receiving, via the first playback event link, a request from a second computing system to access the game state information of the first playback event;
receiving, from the second computing system, a request to initiate a streaming gameplay session of the game application;
executing a second gameplay session of the game application using the game state information such that the virtual environment of the second gameplay session loads in a first game state of the at least one game state; and
streaming the second gameplay session to the second computing system in the first game state of the at least one game state.

2. The computer-implemented method of claim 1, wherein first user inputs of the first computing system control a first virtual entity within the virtual environment during the first gameplay session of the game application.

3. The computer-implemented method of claim 2, wherein second user inputs of the second computing system control the first virtual entity within the virtual environment during the second gameplay session of the game application.

4. The computer-implemented method of claim 3, wherein actions performed by the first virtual entity within the virtual environment during the first gameplay session are displayed as a ghost representation of the first virtual entity during the second gameplay session.

5. The computer-implemented method of claim 2, wherein second user inputs of the second computing system control a second virtual entity within the virtual environment during the second gameplay session of the game application.

6. The computer-implemented method of claim 1, wherein the game state information includes values for a defined set of state parameters that represent at least a portion of total state parameters used to recreate the first game state.

7. The computer-implemented method of claim 6, wherein the game application is configured to generate values for additional game parameters to recreate the first game state.

8. The computer-implemented method of claim 1, wherein the first playback event link is configured to provide access to media data for viewing the first playback event on a network-based media player.

9. The computer-implemented method of claim 1, wherein the first playback event link is an embedded link that includes the game state information.

10. The computer-implemented method of claim 1, wherein the first playback event link includes embedded instructions for a computing system to initiate the streaming of the game application and loading the first game state based on the game state information.

11. The computer-implemented method of claim 1, wherein the game state information is stored on a remote server.

12. The computer-implemented method of claim 1, wherein the first playback event link is at least one of a uniform resource identifier, a text-based link, an image, a video, or an audio link.

13. The computer-implemented method of claim 1 further comprising posting the first playback event link on a social media service or sending the first playback event link to one or more user accounts.

14. A computing system comprising:
   computer hardware configured with specific computer-executable instructions to execute a game application, the game application configured to:
      receive a request to generate a first playback event during a first gameplay session of a game application on a first computing system;
      store game state information associated with the first playback event, wherein the game state information includes at least one game state of a virtual environment of the game application;
      generate a first playback event link, wherein the first playback event link configured to provide access the game state information of the first playback event; and
      receive, via the first playback event link, a request from a second computing system to access the game state information of the first playback event;
      receive, from the second computing system, a request to initiate a streaming gameplay session of the game application;
      execute a second gameplay session of the game application using the game state information such that the virtual environment of the second gameplay session loads in a first game state of the at least one game state; and
      stream the second gameplay session to the second computing system in the first game state of the at least one game state.

15. The computing system of claim 14, wherein first user inputs of the first computing system control a first virtual entity within the virtual environment during the first gameplay session of the game application.

16. The computing system of claim 15, wherein second user inputs of the second computing system control the first virtual entity within the virtual environment during the second gameplay session of the game application.

17. The computing system of claim 14, wherein the first playback event link is an embedded link that includes the game state information.

18. The computing system of claim 14, wherein the first playback event link includes embedded instructions for a computing system to initiate the stream of the game application and load the first game state based on the game state information.

19. The computing system of claim 14, wherein the game state information is stored on a remote server.

20. The computing system of claim 14, wherein the first playback event link is at least one of a uniform resource identifier, a text-based link, an image, a video, or an audio link.

* * * * *